(12) United States Patent
Sassano

(10) Patent No.: US 6,178,420 B1
(45) Date of Patent: Jan. 23, 2001

(54) RELATED TERM EXTRACTION APPARATUS, RELATED TERM EXTRACTION METHOD, AND A COMPUTER-READABLE RECORDING MEDIUM HAVING A RELATED TERM EXTRACTION PROGRAM RECORDED THEREON

(75) Inventor: Manabu Sassano, Kawasaki (JP)

(73) Assignee: Fujitsu Limited, Kawasaki (JP)

( * ) Notice: Under 35 U.S.C. 154(b), the term of this patent shall be extended for 0 days.

(21) Appl. No.: 09/132,140

(22) Filed: Aug. 10, 1998

(30) Foreign Application Priority Data

Jan. 13, 1998 (JP) .................................................. 10-005200

(51) Int. Cl.$^7$ ...................................................... G06F 17/30
(52) U.S. Cl. .......................... 707/6; 707/1; 707/2; 707/5; 707/9
(58) Field of Search .................................. 207/1, 2, 5, 6, 207/9

(56) References Cited

U.S. PATENT DOCUMENTS

| | | | |
|---|---|---|---|
| 5,245,337 | * 9/1993 | Bugajski et al. | 341/51 |
| 5,586,219 | * 12/1996 | Yufik | 395/20 |
| 6,044,351 | * 3/2000 | Jones | 705/2 |

* cited by examiner

Primary Examiner—Thomas G. Black
Assistant Examiner—William Trinh
(74) Attorney, Agent, or Firm—Staas & Halsey LLP

(57) ABSTRACT

The present invention is intended to allow a user to easily and precisely extract related terms through use of mutual information without requiring morphological analysis or syntax analysis, by constituting a related term extraction apparatus from preceding-and-subsequent term extraction means for extracting a preceding term occurring prior to a specified term or a subsequent term occurring subsequent to the same in text data; a frequency calculation means for calculating the occurrence frequencies of the specified term, the preceding terms, and the subsequent terms; probability-of-occurrence calculation means for calculating the occurrence probabilities of the preceding and subsequent terms together with the occurrence probability of the specified term; probability-of-concurrence calculation means for calculating the probabilities of the preceding and subsequent terms cooccurring with the specified term; order-dependent degree-of-association calculation means for calculating an order-dependent degrees of the preceding and subsequent terms cooccurring with the specified term; order-independent degree-of-association calculation means for calculating an order-independent degrees of occurrence of the preceding and subsequent terms with the specified term; and term group extraction means for extracting from the text data a group of terms related to the specified term, on the basis of the degree-of-association information calculated by the order-independent degree-of-association calculation means.

12 Claims, 29 Drawing Sheets

FIG. 4

```
----------------------
GUNMAKEN TOUBU KARA TOCHIGIKEN NIKKO SHI HE ITARU
SANBYAKU KIRO NO MICHINORI

```
----------------------
GUNMAKEN   TOUBU   KARA   TOCHIGIKEN   NIKKO   SHI
HE   ITARU   SANBYAKU   KIRO   NO   MICHINORI

| | |
|---|---|
| ' | 150 |
| NO | 57 |
| HA | 56 |
| 「 | 32 |
| NI | 30 |
| TOCHIGIKEN | 27 |
| DE | 27 |
| ( | 26 |
| ) | 23 |
| GA | 22 |
| RU | 21 |
| WO | 18 |
| TA | 17 |
| SHI | 14 |
| I | 13 |
| OKU | 13 |
| . | 13 |
| TO | 10 |
| KARA | 9 |
| YA | 9 |
| TEI | 8 |
| TE | 8 |
| 」 | 7 |
| SHI | 7 |
| HOKA | 7 |
| SURU | 6 |
| NAKA | 6 |
| NA | 5 |
| TU | 5 |
| RE | 5 |
| – | 5 |
| – | 5 |
| DOU | 5 |
| KENSETSU | 5 |
| KOKUSAI | 5 |
| UTSUNOMIYA | 5 |
| ⋮ | ⋮ |

FIG. 8

| | |
|---|---|
| NO | 2661901 |
| ， | 2188342 |
| 。 | 1630315 |
| WO | 1462333 |
| NI | 1392157 |
| HA | 1368457 |
| GA | 1166910 |
| RU | 1092703 |
| TA | 995274 |
| TO | 819888 |
| SHI | 782989 |
| DE | 729768 |
| NA | 645197 |
| I | 610397 |
| ⋮ | ⋮ |
| KYUGEN | 402 |
| GOSHI | 402 |
| KOUSHA | 402 |
| SIROKU | 402 |
| SYU | 402 |
| SOUKIN | 402 |
| TOUMEI | 402 |
| NIKKO | 402 |
| KAISUSUMU | 402 |
| RYOKOSHA | 402 |
| ON | 401 |
| PETTO | 401 |
| MANER | 401 |
| RINGU | 401 |
| MACHIGAI | 401 |
| ⋮ | ⋮ |

FIG. 9

| | |
|---|---|
| OKU | 11.2 |
| TOCHIGIKEN | 10.9 |
| HOKA | 5.1 |
| SHI | 4.2 |
| NAKA | 3.8 |
| 「 | 3.4 |
| 、 | 3.1 |
| ・ | 3.0 |
| ( | 2.9 |
| YA | 2.9 |
| ) | 2.7 |
| HA | 2.3 |
| KARA | 2.3 |
| DE | 2.2 |
| TE | 1.9 |
| NO | 1.4 |
| NI | 1.4 |
| I | 1.4 |
| RU | 1.3 |
| 」 | 1.3 |
| GA | 1.2 |
| SHI | 1.2 |
| TA | 1.1 |
| TEI | 1.1 |
| SURU | 1.0 |
| ┆ | ┆ |

FIG. 10

| | |
|---|---|
| KIRIFURI | 16.4 |
| TOSHOGU | 16.3 |
| OZE | 14.4 |
| KOKURITSUKOUEN | 14.0 |
| ZENDERA | 13.8 |
| KANTORIKURABU | 13.3 |
| NASU | 13.1 |
| KINUGAWA | 12.9 |
| DOU | 11.7 |
| KAIDOU | 11.6 |
| NIKKO | 11.3 |
| EDO | 10.8 |
| UTSUNOMIYA | 10.0 |
| MIZUUMI | 9.6 |
| ATA | 9.5 |
| TOCHIGIKEN | 8.8 |
| KANKOKYAKU | 8.7 |
| RAIN | 8.6 |
| MURA | 7.6 |
| CHIKU | 7.4 |
| RIZORT | 7.4 |
| KANKO | 7.3 |
| SHI | 6.9 |
| TOHRI | 6.6 |
| HOTERU | 6.1 |
| UCHI | 5.2 |
| NAKA | 5.0 |
| KENSETU | 4.8 |
| . | 4.0 |
| HE | 3.7 |
| — | 3.5 |
| YA | 3.4 |
| NADO | 3.2 |
| DE | 3.1 |
| ⋮ | ⋮ |

FIG. 11

| | |
|---|---|
| KIRIFURI | 16.4 |
| TOSHOGU | 16.3 |
| OZE | 14.4 |
| KOKURITSUKOUEN | 14.0 |
| TOCHIGIKEN | 14.0 |
| ZENDERA | 13.8 |
| KANTORIKURABU | 13.3 |
| NASU | 13.1 |
| KINUGAWA | 12.9 |
| DOU | 11.7 |
| KAIDOU | 11.6 |
| OKU | 11.2 |
| EDO | 10.8 |
| UTSUNOMIYA | 10.0 |
| MIZUUMI | 9.6 |
| ATA | 9.5 |
| KANKOKYAKU | 8.7 |
| RAIN | 8.6 |
| SHI | 8.1 |
| MURA | 7.6 |
| RIZORT | 7.4 |
| CHIKU | 7.4 |
| ⋮ | ⋮ |

FIG. 17

| | |
|---|---|
| YUEIDABRYU | 14.1 |
| KIA | 14.1 |
| FORUKUSUWAGEN | 12.7 |
| KEITAIDENWA | 12.6 |
| BIEMUDABRYU | 12.4 |
| DENSOYO | 12.0 |
| KEIRYOKA | 11.9 |
| DAIMURA | 11.4 |
| KYOUSYUJYO | 11.1 |
| DENKI | 11.1 |
| HAISYUTSUGASU | 11.0 |
| JYAFU | 10.9 |
| DEJITARUSIKI | 10.9 |
| KEITAI | 10.8 |
| BUHIN | 10.8 |
| MITSUWA | 10.7 |
| WAIYAHANESU | 10.7 |
| MOSU | 10.6 |
| GOUBAN | 10.6 |
| MITUOKA | 10.5 |
| JYOYO | 10.5 |
| DENSOHIN | 10.5 |
| WAIYAHANESU | 10.4 |
| EFUESUO | 10.3 |
| FIATTO | 10.3 |
| POKETOBERU | 10.3 |
| KADEN | 10.3 |
| TORYO | 10.3 |
| SIDIPI | 10.2 |
| BANPA | 10.2 |
| AJIA | 10.2 |
| KENSAIN | 10.2 |
| MICHIHIRO | 10.2 |
| HAIGASU | 10.1 |
| AIEFUEI | 10.0 |
| ⋮ | ⋮ |

FIG. 18

| AUDI | 14.3 |
|---|---|
| WAGON | 13.6 |
| NANBA | 13.2 |
| DIEZERU | 12.9 |
| GYAKUYUNYU | 12.2 |
| BIEMUDABRYU | 12.0 |
| KOYO | 11.9 |
| SIENUGI | 11.8 |
| TOUSOU | 11.6 |
| OUTOMACHIKKU | 11.5 |
| TUITOTSU | 11.4 |
| SOCHAKU | 11.3 |
| DENKIJIDOSHA | 11.3 |
| DABRYUDIE | 11.2 |
| NENPI | 10.9 |
| HOREI | 10.9 |
| BENTSU | 10.8 |
| SHAYO | 10.8 |
| TSUKO | 10.8 |
| HANDORU | 10.6 |
| TOME | 10.6 |
| HASIGO | 10.5 |
| SITOROEN | 10.5 |
| RYORIN | 10.5 |
| SIESIE | 10.4 |
| SIYOU | 10.4 |
| NORISUTE | 10.4 |
| CHUSHA | 10.4 |
| EITIE | 10.3 |
| HOURIDASU | 10.3 |
| KURONURI | 10.3 |
| KEIJIDOSHA | 10.2 |
| DOA | 10.1 |
| NANBAHPUREITO | 10.1 |
| MIKISA | 10.1 |
| METANOL | 10.1 |
| ⋮ | ⋮ |

FIG. 19

| | |
|---|---|
| OPEREITINGUSISUTEMU | 13.4 |
| MESSASYUMITTO | 13.2 |
| HACCHAKU | 12.5 |
| AMOI | 12.3 |
| YUTIESHI | 11.7 |
| SENPAKU | 11.5 |
| KYASEI | 11.4 |
| RIESU | 11.4 |
| KANTEI | 11.3 |
| HIKOU | 11.2 |
| JYUNSHITEI | 10.7 |
| HAIJYAKKU | 10.5 |
| YUNAITEDDO | 10.4 |
| RUFUTOHANZA | 10.4 |
| GUNYO | 10.2 |
| ENJIN | 10.0 |
| BURITISHU | 10.0 |
| CHARTAR | 9.9 |
| KARIAGE | 9.8 |
| KITAI | 9.6 |
| JYOUIN | 9.6 |
| FAINANSU | 9.5 |
| BOINGU | 9.5 |
| UCHU | 9.5 |
| SENSHA | 9.5 |
| TSUIRAKU | 9.5 |
| NOTTORI | 9.4 |
| PAIROTTO | 9.2 |
| KOMYUNIKEITA | 9.1 |
| YUSO | 9.1 |
| SHOMEN | 9.0 |
| TOUSAI | 9.0 |
| NORIIRE | 8.9 |
| SOUON | 8.7 |
| BENTSU | 8.6 |
| ZASEKI | 8.6 |
| NARITAKUKO | 8.6 |
| SOUBI | 8.6 |
| SEKAISAIDAI | 8.5 |

FIG. 20

| JIDOSHA | KURUMA | 2839.4 |
|---------|--------|--------|
| JIDOSHA | HIKOKI | 814.4 |

FIG. 22

| | |
|---|---|
| MEGIDO | 19.2 |
| MUBARAKU | 18.6 |
| GARI | 17.1 |
| SIRIA | 15.4 |
| TORUKO | 15.4 |
| YORUDAN | 15.0 |
| KAIRO | 13.4 |
| NASERU | 13.2 |
| SAUJIARABIYA | 13.0 |
| AREKUSANDORIA | 12.9 |
| ISURAERU | 12.3 |
| SAUJI | 12.0 |
| SUEZU | 11.5 |
| MOROKKO | 11.5 |
| KODAI | 10.6 |
| MEN | 10.0 |
| DAITORYO | 9.7 |
| HAN | 9.4 |
| ARABU | 9.3 |
| CHIAN | 9.2 |
| WAKI | 9.2 |
| SHAKKAN | 9.1 |
| IRAKU | 8.9 |
| SANGOKU | 8.9 |
| SEIFUSUJI | 8.9 |
| MURAMATSU | 8.8 |
| ⋮ | ⋮ |

FIG.23

| | |
|---|---|
| ERIZE | 14.4 |
| MENEMU | 14.1 |
| ASADO | 14.0 |
| OZARU | 13.5 |
| RAFUSANJYANI | 13.5 |
| MITTERAN | 13.2 |
| MUBARAKU | 13.2 |
| ROTEU | 12.9 |
| SUHARUTO | 12.8 |
| PURIMAKOFU | 12.8 |
| FUSEIN | 12.5 |
| IRIESUKU | 12.3 |
| GORUBACHOFU | 12.2 |
| BUSSYU | 12.1 |
| ARUBERUTO | 12.0 |
| CHOKUSETSUSENKYO | 12.0 |
| SINSHO | 11.9 |
| PASURAMORA | 11.6 |
| FUJIMORI | 11.4 |
| KOIBISUTO | 11.3 |
| SADATO | 11.3 |
| SHADORI | 11.3 |
| BENKATARAMAN | 11.3 |
| WARUTOHAIMU | 11.3 |
| KINSHOKI | 11.3 |
| KINDOUJI | 11.3 |
| KORORU | 11.2 |
| ZAIDO | 11.2 |
| SIANUKU | 11.2 |
| SOARESU | 11.2 |
| ⋮ | ⋮ |

FIG. 26

| | |
|---|---|
| ENTEIMOKU | 16.5 |
| CHOUSENMINSHUSHUGI JINMINKYOWAKOKU | 14.6 |
| SYUCHINGYOKU | 13.1 |
| FUNNAN | 12.9 |
| KINNISSEI | 12.8 |
| TUGUNAI | 12.7 |
| KOUNAN | 12.4 |
| CHUSO | 12.4 |
| HANMONTEN | 12.0 |
| KAN | 11.5 |
| KOKKO | 11.5 |
| KOKUSAIGENSHIRYOKUKIKAN | 11.5 |
| HOUCHO | 11.2 |
| AI EI E EI | 11.1 |
| TEKISHI | 11.1 |
| KANKOKU | 10.9 |
| SEIJYOKA | 10.9 |
| WUOCHYAR | 10.6 |
| KANEMARU | 10.4 |
| JYURITSU | 10.4 |
| YOUEIKUN | 10.4 |
| SEKKIN | 10.2 |
| GYOSEN | 10.1 |
| SENSEKI | 10.1 |
| NANBOKU | 10.1 |
| RYOKEN | 10.0 |
| SEKI | 9.9 |
| SO | 9.8 |
| SHAKUHO | 9.8 |
| TAIWA | 9.8 |
| DAHO | 9.7 |
| YOKURYU | 9.7 |
| DEKATA | 9.6 |
| SASATSU | 9.5 |
| ⋮ | ⋮ |

FIG. 27

| | |
|---|---|
| KITACHOSEN | 14.6 |
| ENTEIMOKU | 13.5 |
| KOKKI | 12.7 |
| KINNISSEI | 12.0 |
| SENSEKI | 11.6 |
| SEKI | 11.5 |
| YOKURYU | 11.4 |
| KANKOKU | 11.2 |
| SYUSEKI | 10.8 |
| KOKKO | 10.7 |
| PYONYAN | 10.4 |
| HOUMON | 9.9 |
| SEIJYOKA | 9.7 |
| DAN | 9.7 |
| KAN | 9.6 |
| ROUDOUTO | 9.6 |
| CHOSEN | 9.5 |
| FUKUSORI | 9.4 |
| KORITSU | 8.9 |
| NANBOKU | 8.9 |
| GYOSEN | 8.5 |
| BETONAMU | 8.3 |
| JYURITSU | 8.2 |
| GENSHIRYOKU | 8.1 |
| TAIWA | 8.0 |
| GUNSYUK | 7.8 |
| CHUGOKU | 7.6 |
| ⋮ | ⋮ |

FIG. 28

| | |
|---|---|
| ENTEIMOKU | 16.5 |
| SYUCHINGYOKU | 13.1 |
| FUNNAN | 12.9 |
| KINNISSEI | 12.8 |
| KOKKI | 12.7 |
| TSUGUNAI | 12.7 |
| KOUNAN | 12.4 |
| CHUSO | 12.4 |
| KINNISSI | 12.0 |
| HANMONTEN | 12.0 |
| SENSEKI | 11.6 |
| KAN | 11.5 |
| KOKKO | 11.5 |
| KOKUSAIGENSHIRYOKUKIKAN | 11.5 |
| SEKI | 11.5 |
| YOKURYU | 11.4 |
| KANKOKU | 11.2 |
| HOCHOU | 11.2 |
| AI EI E EI | 11.1 |
| TEKISI | 11.1 |
| SEIJYOKA | 10.9 |
| SYUSEKI | 10.8 |
| WUOCHAR | 10.6 |
| KANEMARU | 10.4 |
| JYURITSU | 10.4 |
| PYONYAN | 10.4 |

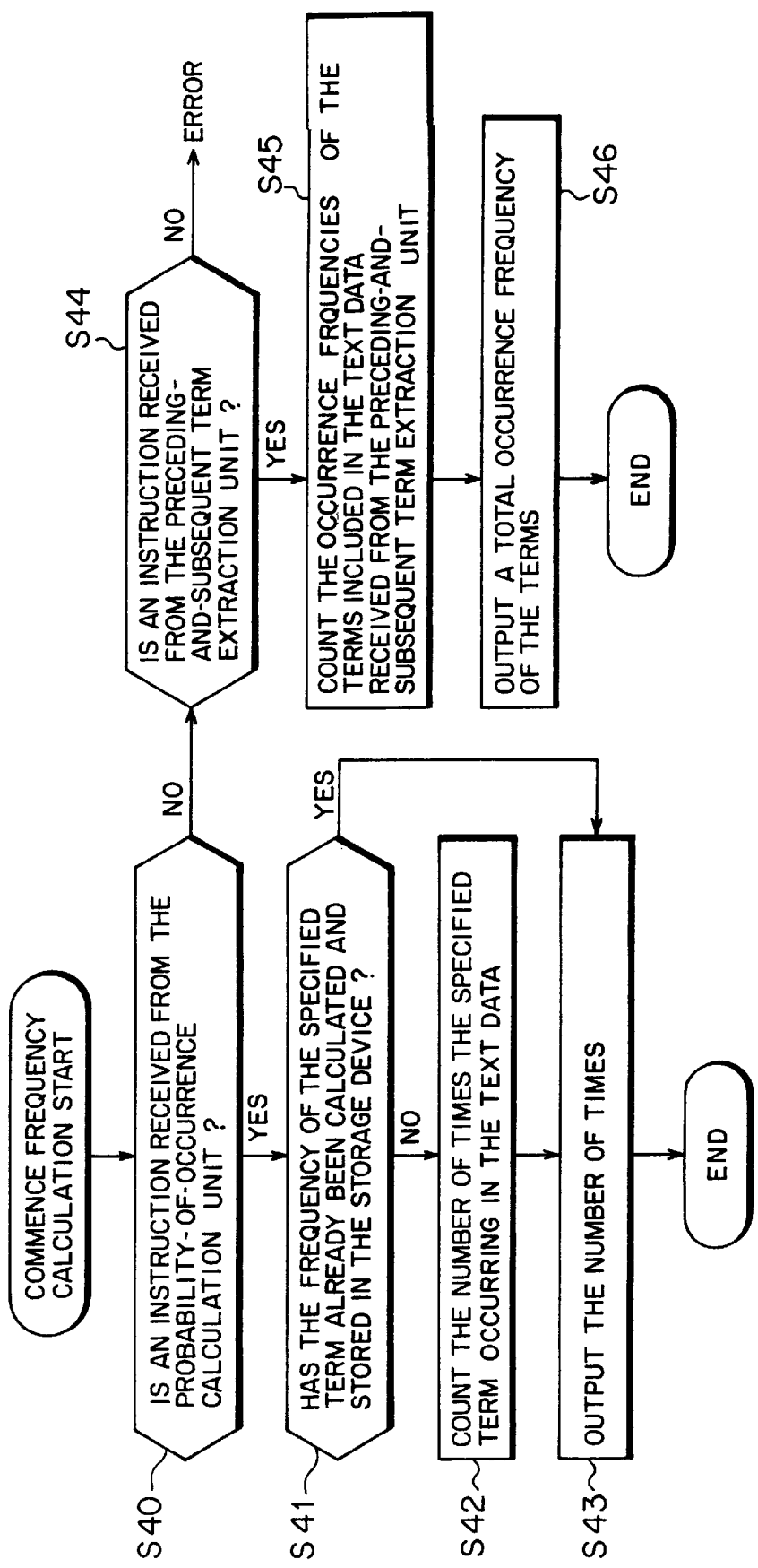

RELATED TERM EXTRACTION APPARATUS, RELATED TERM EXTRACTION METHOD, AND A COMPUTER-READABLE RECORDING MEDIUM HAVING A RELATED TERM EXTRACTION PROGRAM RECORDED THEREON

BACKGROUND OF THE INVENTION (1) Field of the Invention

The present invention relates to a related term extraction apparatus, a related term extraction method, and a computer-readable recording medium having a related term extraction program recorded thereon, all of which are suitable for use in extracting related terms from mass-storage document data.

(2) Description of the Related Art

The most common existing practice for extracting related terms from document data causes manual extraction of document data terms that can be considered related and forming a list of the thus-extracted terms, or preparing a related-term list by utilization of a manually prepared thesaurus.

Several techniques for preparing a related-term list, which will be described later, have already been proposed as methods of automatically extracting related terms through use of a computer without requiring manual extraction operations.

One of the techniques involves preparation of a related-term list on the basis of the occurrence frequency of two related terms, i.e., the frequency of two terms cooccurring with each other in document data. The range within which two terms are defined as cooccurring with each other is set to various values, e.g., a range of within a few words, a range of within tens of words, a duration of within one minute, or a range of within one paragraph.

Other than the technique of simply aggregating the frequencies of two terms cooccurring with each other and of determining the terms having high concurrence frequencies to be related terms, the following techniques are also employed.

Specifically, in a technique that has already been proposed, a set of keywords (or a group of terms) is determined beforehand, and the frequencies of each keyword occurring with other terms are aggregated. A related-term list is prepared through such aggregation operations.

In another technique that has already been put forth, a document (or a written item) for which a related-term list will be prepared is subjected to morphological analysis, so that the part of speech of each term is determined. Subsequently, functional words are removed from the document, or the frequencies of only each content word cooccurring with other terms are aggregated. A related-term list is prepared through such aggregation operations.

In still another technique that has already been put forth, on the basis of the frequencies of terms cooccurring with a specified term in a document, terms having high frequencies of cooccurring with the specified term and terms having low frequencies of cooccurring with the specified term are removed during the process of preparation of a related-term list, thus preparing a related-term list.

In yet anther technique that has already been put forth, terms having special relationships are determined through syntax analysis, and the frequencies of the thus-determined terms cooccurring with each other are aggregated. A related-term list is prepared through such aggregation operations.

Other than the technique of using in its present form the frequency of two terms cooccurring with each other as a criterion for determining whether or not these terms are related to each other, there has already been proposed another technique (hereinafter referred to as "technique A") which uses a value called mutual information.

Here, the mutual information (or transferred information) represents a difference between information which is transferred as a result of ascertaining the occurrence of an event "x," and conditional information which is transferred as a result of ascertaining the occurrence of an event "x" on condition that another event "y" has occurred. Mathematically, the mutual information represents a pair of events xi, yi, where xi designates an input message and yi designates an output message. Taking p(xi, yi) as a joint probability of occurrence of events xi and yi; p(xi|yi) as a probability of an event xi occurring on condition that an event yi has occurred; p(yi|xi) as a probability of an event yi occurring on condition that an event xi has occurred; p(xi) as a probability of occurrence of an event xi; and p(yi) as a probability of occurrence of an event yi, mutual information (or transferred information) T(xi|yi) relating to the pair of events xi, yi is given by Equation 1 provided below.

$$\begin{aligned} T(xi \mid yi) &= \log \frac{1}{p(xi)} - \log \frac{1}{p(xi \mid yi)} \quad &\text{(Eq. 1)}\\ &= \log \frac{p(xi \mid yi)}{p(xi)} \\ &= \log \frac{p(xi, yi)}{p(xi)p(yi)} \\ &= \log \frac{p(yi \mid xi)}{p(yi)} \\ &= T(yi \mid xi) \end{aligned}$$

It is also conceivable that the degree of association of a specified term xi with a corresponding term yi can be calculated from the mutual information through calculation of the mutual information T(xi|yi) by the expression defined by Eq. 1, and that a related-term list can be prepared from values obtained by the calculation.

Manual preparation of a related-term list is laborious and adds to preparation cost. Further, in order to cause the related-term list to deal with new terms, such a manual-extraction technique is required for preparation of new related-term list each time new terms appear.

Even the method which uses a computer and determines key words beforehand requires determination of key words beforehand.

The method, which deletes functional words or solely extracts content words, requires acquisition of information regarding the part of speech of each term through use of a technique such as morphological analysis.

The method, which eliminates related terms of high and low occurrence frequencies, encounters difficulty in identifying as a term to be eliminated a term whose occurrence frequency is above ascertain level or below a certain other level.

The technique, which requires syntax analysis, becomes troublesome to an extent corresponding to the labor required for syntax analysis.

In the technique, which requires morphological analysis or syntax analysis, the analysis is also required to have sufficient performance. Further, in order to ensure sufficient performance, a dictionary or a grammatical database must be incessantly updated.

The technique A of preparing a related-term list through use of the expression regarding the mutual information T(xi|yi) shown in Eq. 1 is not necessarily required to determine beforehand items to be subjected to related-term search operations or to process a document through morphological analysis. However, since the technique A depends on the sequence in which terms appear, only a related-term list is prepared depending on a sequence in which the terms appear, thus posing a problem of the user encountering considerable difficulty in understanding the related-term list prepared from the mutual information.

SUMMARY OF THE INVENTION

The present invention has been conceived to solve the foregoing problems, and the object of the present invention is to provide a related term extraction apparatus, a related term extraction method, and a computer-readable recording medium having a related term extraction program recorded thereon, all of which allow the user to easily and precisely extract related terms through use of mutual information without requiring morphological analysis or syntax analysis.

A related term extraction apparatus for solving the foregoing problems comprises a preceding-and-subsequent term extraction section which extracts a preceding term occurring prior to a specified term or a subsequent term occurring subsequent to the same in text data; a frequency calculation section capable of calculating the occurrence frequency of the specified term in the text data, the occurrence frequency of the preceding or subsequent term in the text data, and the occurrence frequencies of the preceding and subsequent terms extracted by the preceding-and-subsequent term extraction section in the text data; a probability-of-occurrence calculation section which can calculate the occurrence probabilities of the preceding and subsequent terms together with the occurrence probability of the specified term, from information regarding the occurrence frequency of the specified term in the text data and information regarding the occurrence frequencies of the preceding and subsequent terms in the text data, both of which are received from the frequency calculation section; a probability-of-concurrence calculation section which calculates the probability of the preceding term cooccurring with the specified term and the probability of the subsequent term cooccurring with the specified term, from information regarding the occurrence frequency of the preceding term extracted by the preceding-and-subsequent term extraction section and from information regarding the occurrence frequency of the subsequent term extracted by the preceding-and-subsequent term extraction section, both of which are received from the frequency calculation section; an order-dependent degree-of-association calculation section which calculates an order-dependent degree of association of the preceding term with the specified term and an order-dependent degree of association of the subsequent term with the specified term, from the occurrence probability of the specified term, from that of the preceding term, and from that of the subsequent term, all of which are received from the probability-of-occurrence calculation section, as well as from information regarding the probability of the preceding term cooccurring with the specified term and information regarding the probability of the subsequent term cooccurring with the specified term, both of which are received from the probability-of-concurrence calculation section; an order-independent degree-of-association calculation section which calculates an order-independent degree of association of the preceding term with the specified term and an order-independent degree of association of the subsequent term with the specified term, from information regarding the degree of association received from the order-dependent degree-of-association calculation section; and a term group extraction section which extracts from the text data a group of terms related to the specified term, on the basis of the degree-of-association information calculated by the order-independent degree-of-association calculation section.

Accordingly, the related term extraction apparatus according to the present invention has the advantage of being able to precisely extract related terms which are easily understood by the user without requiring morphological analysis or syntax analysis, as a result of the term group extraction section using the information calculated by the order-independent degree-of-association calculation section.

A related term extraction method for solving the aforementioned problems comprises a keyword specification step for specifying a keyword for which related terms are extracted from the text data; a preceding-and-subsequent term extraction step for extracting a preceding term occurring prior to the specified term in the text data and a subsequent term occurring subsequent to the specified term in the text data; a probability-of-concurrence calculation step for calculating probabilities of the preceding and subsequent terms, which are extracted in the preceding-and-subsequent term extraction step, cooccurring with the term specified in the keyword specification step; a probability-of-occurrence calculation step for calculating the occurrence probability of the term, which is specified in the keyword specification step, and the occurrence probabilities of the preceding and subsequent terms extracted in the preceding-and-subsequent term extraction step; an order-dependent degree-of-association calculation step for calculating an order-dependent degree of association of the preceding term with the specified term and an order-dependent degree of association of the subsequent term with the specified term, from information regarding the occurrence probability of the specified term, from that of the preceding term, and from that of the subsequent term, all of which are calculated in the probability-of-occurrence calculation step, as well as from information regarding the probability of the preceding term cooccurring with the specified term and information regarding the probability of the subsequent term cooccurring with the specified term, both of which are calculated in the probability-of-concurrence calculation step; an order-independent degree-of-association calculation step for calculating an order-independent degree of association of the preceding term with the specified term and an order-independent degree of association of the subsequent term with the specified term, from information regarding the degree of association calculated in the order-dependent degree-of-association calculation step; and a term group extraction step for extracting from the text data a group of terms related to the specified term, on the basis of the degree-of-association information calculated in the order-independent degree-of-association calculation step.

Accordingly, the related term extraction method according to the present invention has the advantage of precisely extracting related terms which are easily understood by the user without requiring morphological analysis or syntax analysis, through execution of the keyword specification step, the preceding-and-subsequent term extraction step, the probability-of-concurrence calculation step, the probability-of-occurrence calculation step, the order-dependent degree-of-association calculation step, the order-independent degree-of-association calculation step, and the term group extraction step, as well as by use of the information calculated in the order-independent degree-of-association calculation step for processing in the term group extraction step.

A computer-readable recording medium having a related term extraction program recorded thereon for solving the aforementioned problems according to the present invention, comprises the following functions to be executed by a computer in order to extract from text data a group of terms related to a certain term: a keyword specification function of specifying a keyword for which related terms are extracted from the text data; a preceding-and-subsequent term extraction function of extracting a preceding term occurring prior to the specified term in the text data and a subsequent term occurring subsequent to the specified term in the text data; a probability-of-concurrence calculation function of calculating probabilities of the preceding and subsequent terms, which are extracted by means of the preceding-and-subsequent term extraction function, cooccurring with the term specified by means of the keyword specification function; a probability-of-occurrence calculation function of calculating the occurrence probability of the term, which is specified by means of the keyword specification function, and the occurrence probabilities of the preceding and subsequent terms extracted by means of the preceding-and-subsequent term extraction function; an order-dependent degree-of-association calculation function of calculating an order-dependent degree of association of the preceding term with the specified term and an order-dependent degree of association of the subsequent term with the specified term, from information regarding the occurrence probability of the specified term, from that of the preceding term, and from that of the subsequent term, all of which are calculated by means of the probability-of-occurrence calculation function, as well as from information regarding the probability of the preceding term cooccurring with the specified term and information regarding the probability of the subsequent term cooccurring with the specified term, both of which are calculated by means of the probability-of-concurrence calculation function; an order-independent degree-of-association calculation function of calculating an order-independent degree of association of the preceding term with the specified term and an order-independent degree of association of the subsequent term with the specified term, from information regarding the degree of association calculated by means of the order-dependent degree-of-association calculation function; and a term group extraction function of extracting from the text data a group of terms related to the specified term, on the basis of the degree-of-association information calculated by means of the order-independent degree-of-association calculation function.

Accordingly, the computer-readable recording medium having a related term extraction program recorded thereon according to the present invention has the advantage of precisely extracting related terms which are easily understood by the user without requiring morphological analysis or syntax analysis, by the computer performing the keyword specification function, the preceding-and-subsequent term extraction function, the probability-of-concurrence calculation function, the probability-of-occurrence calculation function, the order-dependent degree-of-association calculation function, the order-independent degree-of-association calculation function, and the term group extraction function.

BRIEF DESCRIPTION OF THE DRAWINGS

FIG. 4 is a schematic representation showing one text data set according to one embodiment of the present invention;

FIG. 5 is a schematic representation showing one text data set segmented on a per-term or per-morpheme basis according to one embodiment of the present invention;

FIGS. 7 and 8 are charts showing one example of frequency-of-occurrence information calculated by a frequency calculation unit according to one embodiment of the present invention;

FIGS. 9 and 10 are charts showing one example of degree-of-association information calculated by an order-dependent degree-of-association calculation unit according to one embodiment of the present invention;

FIG. 11 is a chart showing one example of degree-of-association information calculated by an order-independent degree-of-association calculation unit according to one embodiment of the present invention;

FIG. 17 shows a list of terms extracted by the term group extraction unit according to the first modification of the embodiment of the present invention as being related to a term "自動車 (JIDOSHA; automobile)";

FIG. 18 shows a list of terms extracted by the term group extraction unit according to the first modification of the embodiment of the present invention as being related to a term "車 (KURUMA; car)";

FIG. 19 shows a list of terms extracted by the term group extraction unit according to the first modification of the embodiment of the present invention as being related to a term "航空機 (KOKUKI; aircraft)";

FIG. 20 shows a degree of similarity between the terms "自動車 (JIDOSHA; automobile)" and "車 (KURUMA; car)" and that between the terms "自動車 (JIDOSHA; automobile)" and "航空機 (KOKUKI; aircraft)" calculated by a degree-of-similarity calculation unit according to the first modification of the embodiment of the present invention;

FIG. 22 shows a list of terms extracted by a term group extraction unit according to the second modification of the embodiment of the present invention as being related to a term "エジプト (EJIPUTO; Egypt)";

FIG. 23 shows a list of terms extracted by a term group extraction unit according to the second modification of the embodiment of the present invention as being related to a term "大統領 (DAITORYO; president)"

FIG. 26 shows a list of terms extracted by a term group extraction unit according to a third modification of the embodiment of the present invention as being related to a term "北朝鮮 (KITACHOSEN; North Korea)";

FIG. 27 shows a list of terms extracted by the term group extraction unit according to the third modification of the embodiment of the present invention as being related to a term "朝鮮民主主義人民共和国 (CHOSEN-MINSYUSHUGI-JINMIN-KYOWA-KOKU; the Democratic People's Republic of Korea)";

FIG. 28 shows a list of terms extracted by the term group extraction unit according to the third modification of the embodiment of the present invention as being related to the terms "北朝鮮 (KITACHOSEN; North Korea)" and "朝鮮民主主義人民共和国 (CHOSEN-MINSYUSHUGI-JINMIN-KYOWA-KOKU; the Democratic People's Republic of Korea)";

FIG. 30 is a flowchart depicting the flow of processing when the CPU, which serves as a frequency calculation unit, executes the related term extraction program in the computer according to still another embodiment of the present invention.

DESCRIPTION OF THE PREFERRED EMBODIMENTS

Preferred embodiments of the present invention will be described by reference to the drawings.

Figure 1:
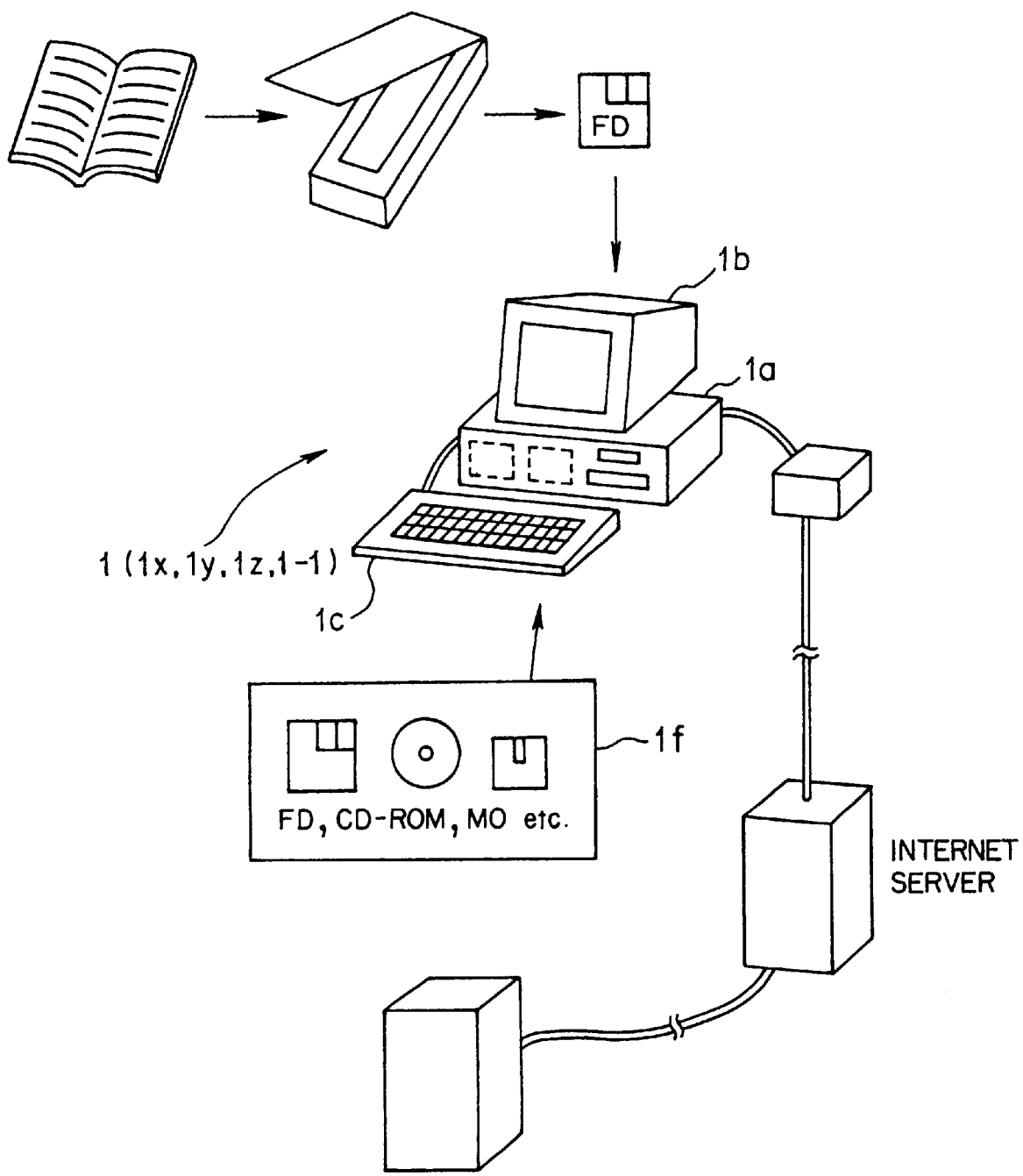
FIG. 1 is a schematic representation showing a system to which is installed a related term extraction apparatus according to one embodiment of the present invention.

(1) Description of One Preferred Embodiment (a) Explanation of Hardware Configuration FIG. 1 depicts a system configuration in which a related term extraction apparatus according to one embodiment of the present invention is realized. As shown in FIG. 1, the system 1 comprises a main unit 1a incorporating a CPU or required memory units, a display 1b, and a keyboard 1c.

The main unit 1a loads a related term extraction program into a hard disk (not shown) or the like, from a medium 1f having the related term extraction program recorded thereon, e.g., a CD-ROM, an optical disk (hereinafter referred to simply as an "MO"), a floppy disk (hereinafter referred to simply as an "FD") or the like. At the time of execution of the related term extraction program, the related term extraction program is expanded into memory (not shown), and according to this program the CPU (not shown) controls electronic devices connected to the main unit 1a such as the display 1b and the keyboard 1c.

Figure 2:
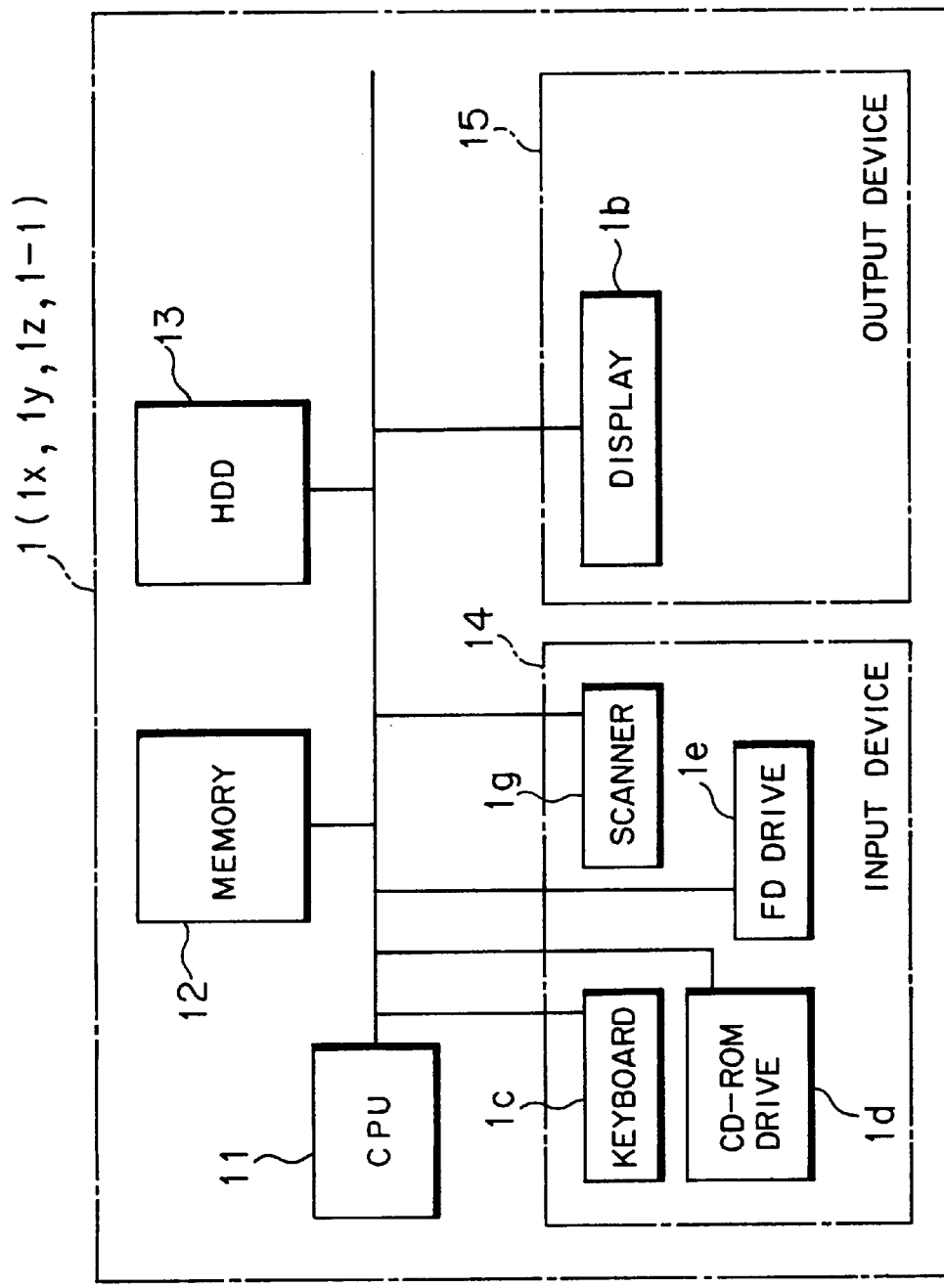
FIG. 2 is a block diagram showing the principal elements of the system to which is installed a related term extraction apparatus according to one embodiment of the present invention.

FIG. 2 is a block diagram showing the principal elements of the general-purpose computer system by which a related term extraction apparatus is realized and to which is installed the related term extraction program according to the present invention. This general-purpose computer system (hereinafter may be referred to simply as a "general-purpose computer" or "computer") 1 comprises, as principal elements, a CPU 11, memory 12, a hard disk 13, an input device 14, and an output device 15.

The hard disk 13 holds the related term extraction program which is recorded on a recording medium via a CD-ROM drive 1d or an FD drive 1e.

The input device 14 is used for inputting information, such as data or a program, into the CPU 11. The input device 14 corresponds to the keyboard 1c, a mouse (not shown), the CD-ROM drive 1d, or the FD drive 1e.

The output device 15 outputs to the outside of the computer image display information or retrieved information output from the CPU 11. The display 1b corresponds to the output device 15.

(b) Description of the Embodiment

Figure 3:
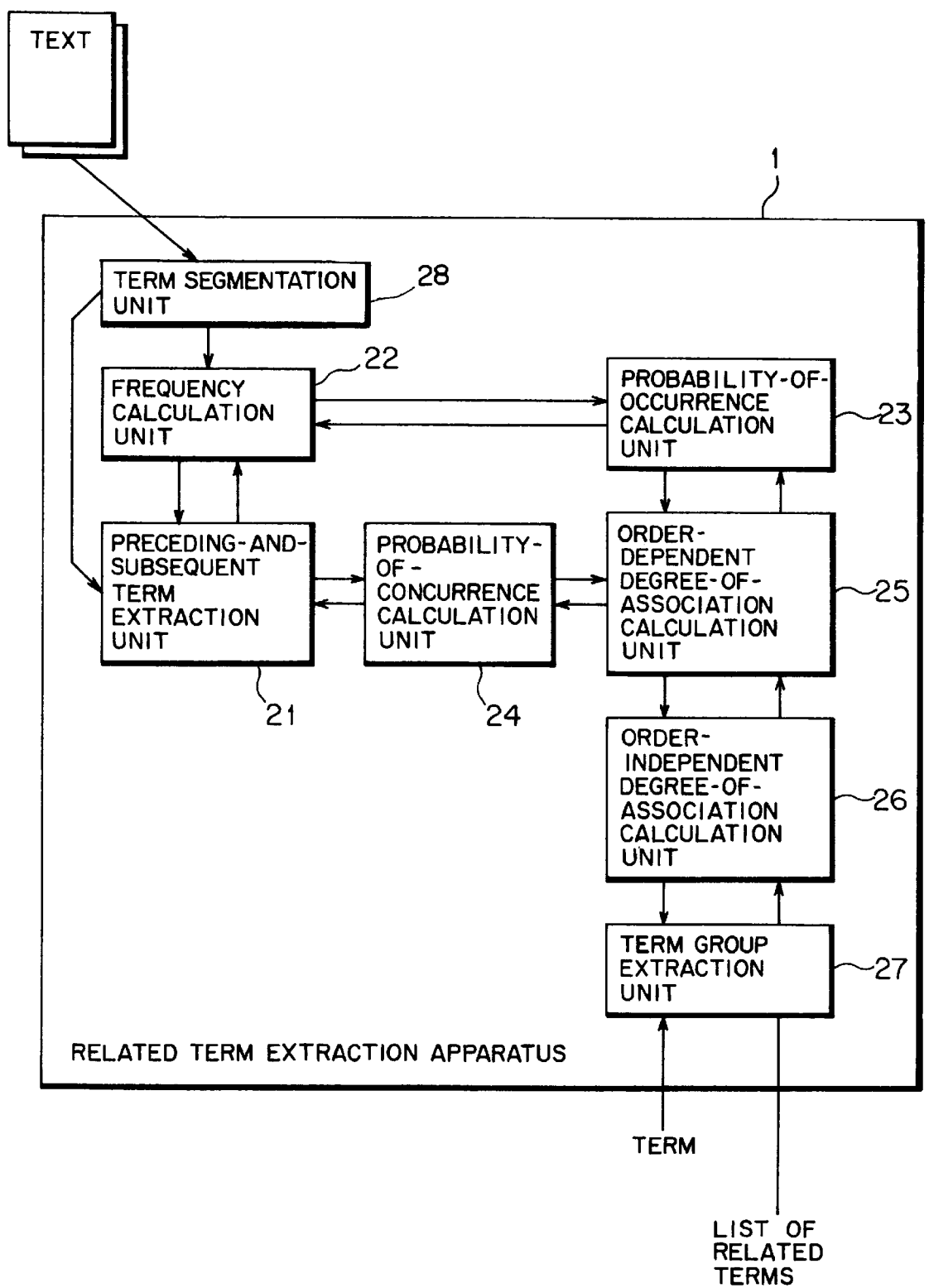
FIG. 3 is a block diagram showing the principal elements of the system to which is installed a related term extraction apparatus according to one embodiment of the present invention.

FIG. 3 shows a block diagram of a related term extraction apparatus according to the embodiment of the present invention. As shown in FIG. 3, the related term extraction apparatus 1 comprises a preceding-and-subsequent term extraction unit (a preceding-and-subsequent term extraction means) 21, a frequency calculation unit 22, a probability-of-concurrence calculation unit 24, a probability-of-occurrence calculation unit 23, an order-dependent degree-of-association-of-terms calculation unit 25, an order-independent degree-of-association-of-terms calculation unit 26, a term group extraction unit 27, a term segmentation unit 28, and a storage unit (not shown).

The preceding-and-subsequent term extraction unit 21 extracts a term occurring in text data prior to or subsequent to a specified term. The specified term is a keyword in text data, and a related term is extracted from document information on the basis of the specified term.

For convenience of explanation, a set of terms occurring in text data is taken as W; a total number of terms included in the text data is taken as N; each term occurring in the text data is taken as $\omega i$ ($\omega i \epsilon W$, $1 \leq i \leq w$) and a total number of types of terms occurring in the text data is taken as "w."

Hereinafter, a term occurring prior to a keyword (or referred to simply as a "preceding term") may sometimes be referred to as $\omega fi$, and a term occurring subsequent to a keyword(or referred to simply as a "subsequent term") may sometimes be referred to as $\omega bi$.

The frequency calculation unit (a frequency calculation means) 22 is capable of calculating the occurrence frequency of a specified term (hereinafter referred to as a "keyword") in text data, the occurrence frequency of a preceding or subsequent term in the text data, and the occurrence frequencies of the preceding and subsequent terms extracted by the preceding-and-subsequent term extraction unit 21 in the text data. The term "frequency" used herein is an index for representing the number of keywords included in a given amount of textual information.

For example, provided that M (M is a natural number) English terms X are included in an English text comprising 1,000 words, the numerical value M is an index which represents the number of times the term X appears throughout the text. The range within which the occurrence frequency of a term is calculated is determined by the system maintainer or according to a design prepared by a designer.

The frequency $f(\omega i)$ of the term $\omega i$ occurring in the text data is expressed by a relationship such as that represented by Equation 2.

$$\sum_{i=1}^{w} f(\omega i) = N \qquad (2)$$

From information regarding the occurrence frequency of the specified term and from information regarding the occurrence frequencies of the preceding and subsequent terms in the text data, both of which are received from the frequency calculation unit 22, the probability-of-occurrence calculation unit (probability-of-occurrence calculation means) 23 is capable of calculating the occurrence probabilities of the preceding and subsequent terms together with the occurrence probability of the specified term.

An occurrence probability $P(\omega i)$ of the term $\omega i$ in the text data is expressed by a relationship such as that represented by Equation 3.

$$P(\omega i) = \frac{f(\omega i)}{N} \qquad (3)$$

From information regarding the occurrence frequency of the preceding term extracted by the preceding-and-subsequent term extraction unit 21 and from information regarding the occurrence frequency of the subsequent term extracted by the preceding-and-subsequent term extraction unit 21, both of which are received from the frequency calculation unit 22, the probability-of-concurrence calculation unit (a probability-of-concurrence calculation means) 24 calculates the probability of the preceding term cooccurring with the specified term and the probability of the subsequent term cooccurring with the specified term (such a probability will be hereinafter referred to simply as a "probability-of-concurrence").

An occurrence probability of terms $\omega i$ and $\omega j$ in this order in the text data is represented by $P(\omega i, \omega j)$.

To calculate the probability-of-concurrence, the occurrence frequency of each of preceding and subsequent terms extracted by the preceding-and-subsequent term extraction unit 21 is calculated. Provided that information regarding the occurrence frequency of the preceding terms extracted is $f(\omega fi)=f(\omega i, \omega k)$ and information regarding the occurrence frequency of the subsequent term extracted is $f(\omega bi)=f(\omega i, \omega k)$, the probability-of-concurrence of the preceding term can be defined as $P(\omega i, \omega k)=f(\omega i, \omega k)/N$, and the probability-of-concurrence of the subsequent term can be defined as $P(\omega i, \omega k)=f(\omega i, \omega k)/N$.

In this embodiment, as an example, the occurrence frequency of the term extracted as the preceding term, which is included in the term list, is $f(\omega fi)$. In other words, $f(\omega i, \omega k)$ represents the frequency of the terms $\omega i, \omega k$ occurring in this order in the text data.

From information regarding the occurrence probability of the specified term, from that of the preceding term, and from that of the subsequent term, all of which are received from the probability-of-occurrence calculation unit 23, as well as from information regarding the probability of the preceding term cooccurring with the specified term and information regarding the probability of the subsequent term cooccurring with the specified term, both of which are received from the probability-of-concurrence calculation unit 24, the order-dependent degree-of-association calculation unit (an order-dependent degree-of-association calculation means) 25 calculates an order-dependent degree of association of the preceding term with the specified term and an order-dependent degree of association of the subsequent term with the specified term.

An order-dependent degree of association of a term is defined by Equation 4 provided below, and a ratio of occurrence of the term $\omega i$ with the term $\omega j$ is also defined as $$A(\omega i, \omega j) = \log \frac{P(\omega i, \omega j)}{P(\omega i)P(\omega j)} = Aij. \qquad (4)$$

$P(\omega i, \omega j)$ represents the probability of the terms $\omega i$ and $\omega j$ occurring in a corpus (a massive amount of data).

An order-dependent degree of association of the terms $\omega i$ and $\omega j$, i.e., $A(\omega i, \omega j)$, may often be referred to simply as "Aij."

From information regarding the degree of association received from the order-dependent degree-of-association calculation unit 25, the order-independent degree-of-association calculation unit (an order-independent degree-of-association calculation means) 26 calculates an order-independent degree of association of the preceding term with the specified term and an order-independent degree of association of the subsequent term with the specified term.

A degree of association of the term $\omega i$ with the term $\omega j$, i.e., $r(\omega i, \omega j)$, is defined by Equation 5 provided below.

$$r(\omega i, \omega j) = \sqrt{Aij^2 + Aji^2} \qquad (5)$$

On the basis of the degree-of-association information calculated by the order-independent degree-of-association calculation unit 26, the term group extraction unit (a term group extraction means) 27 extracts from the text data a group of terms related to the specified term. The term group extraction unit 27 extracts highly-ranked related terms in decreasing order of high frequency.

The term segmentation unit (a term segmentation means) 28 separates the text data on a per-term or per-morpheme basis.

The storage unit (not shown) stores at least one of computational results or extraction results related to a specified term.

The storage unit stores the frequency information calculated by the frequency calculation unit 22, the information regarding terms extracted by the preceding-and-subsequent term extraction unit 21, the information regarding the probability-of-concurrence calculated by the probability-of-concurrence calculation unit 24, the frequency-of-appearance information calculated by the probability-of-occurrence calculation unit 23, the degree-of-association information calculated by the order-independent degree-of-association calculation unit 26, and the information regarding the text data segmented into terms or morphemes by the term segmentation unit 28.

The foregoing units, the CPU 11, the main memory 12, the hard disk 13, and other elements will now be explained in association with one another.

The CPU 11, which serves as the term segmentation unit 28, separates document information contained in the text data, on a per-term or per-morpheme basis.

Although in the present embodiment the text data are stored in a medium, such as an FD, a CD-ROM, or the hard disk 13, the text data may alternatively be read from a scanner 1g. Here, FIG. 1 also shows a case where a document extracted from a book or the like by means of the scanner 1g is stored as text data in an FD 1h and where the FD 1h is used in the related term extraction apparatus 1. Although the following descriptions are based on the assumption that text data are stored in the hard disk 13, the same shall apply even to a case where text data are stored in a medium such as an FD or a CD-ROM.

At the time of morphological analysis of the text data, the CPU 11 de-archives the document information regarding the text data into the memory 12, dividing the document information on a per-term or per-morpheme basis. The document information regarding the text data, which has been segmented on a per-term or per-morpheme basis through morphological analysis, is stored into a storage unit, i.e., the hard disk 13 or the memory 12.

For example, the CPU 11, which serves as the term segmentation unit 28, separates the text data, having contents such as those shown in FIG. 4, on a per-term or per-morpheme basis, as shown in FIG. 5. An explanation will be provided on the basis of the text data having, as contents, newspaper articles shown in FIG. 4. In FIGS. 4 and 5, a Japanese sentence is written in corresponding roman alphabetic spellings.

Upon receipt of information regarding a keyword ωk (hereinafter may often be referred to as "ωk") by way of the user's operation of the keyboard 1c, the CPU 11, which serves as the preceding-and-subsequent term extraction unit 21, extracts the term ωfi occurring prior to the keyword ωk or the term ωbi occurring subsequent to the keyword ωk.

At the time of extraction of the term ωfi occurring before the keyword ωk or the term ωbi occurring subsequent to the same, the CPU 11 de-archives the document information (or text data) stored in the hard disk 13 into the memory 12, extracting the preceding term ωfi or the subsequent term ωbi. Results of such extraction are stored into the memory 12 or the hard disk 13.

Figure 6A:
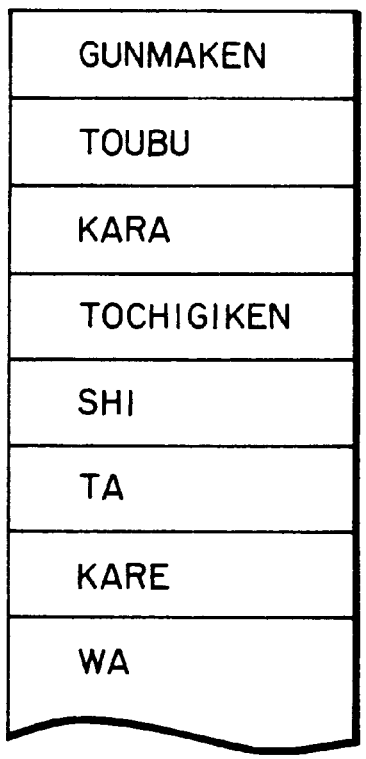
FIGS. 6(a) and 6(b) are schematic representations showing one example of terms extracted by a preceding-and-subsequent term extraction unit according to one embodiment of the present invention.
Figure 6B:
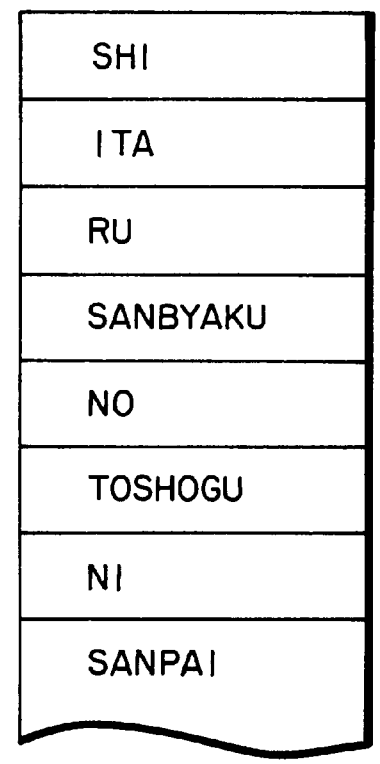

FIGS. 6(a) and 6(b) show information regarding the terms ωfi and ωbi extracted as occurring prior to and subsequent to the keyword ωk "日 光" selected from the text data having its document information segmented on a per-term or per-morpheme basis such as that shown in FIG. 5. FIG. 6(a) shows information regarding the terms occurring prior to the keyword ωk "日 光," and FIG. 6(b) shows information regarding the terms occurring subsequent to the keyword ωk "日 光." The keyword ωk written in Japanese characters is expressed as "NIKKO" in roman alphabetic spelling. Hereafter, Japanese characters will be followed by their corresponding roman alphabetic spellings in parenthesis. In FIGS. 4, 5, 6(a), 6(b), 7, 8, 9, 10, 11, 17, 18, 19, 20, 22, 23, 24, 26, 27, 28, Japanese terms are shown in their corresponding roman alphabetic spellings.

The CPU 11, which serves as the preceding-and-subsequent term extraction unit 21, stores the extracted terms or morphemes, such as those shown in FIGS. 6(a) and 6(b), into a table formed in the memory 12.

The CPU 11, which serves as the frequency calculation unit 22, calculates a frequency f(ωk) of the keyword occurring in the text data, a frequency f(ωi) of the preceding or subsequent term occurring in the document information regarding the text data, an occurrence frequency f(ωfi) of the preceding term extracted by the preceding-and-subsequent term extraction unit, and an occurrence frequency f(ωbi) of the subsequent term extracted by the same. For example, the CPU 11, which serves as the frequency calculation unit 22, calculates the occurrence frequency f(ωfi) of the preceding term ωfi on the basis of the number of the terms which are extracted as the preceding terms, such as those shown in FIG. 6(a), and which appear in the term list.

The CPU 11, which serves as the frequency calculation unit 22, calculates the occurrence frequencies of the terms by arranging the data items, such as those shown in FIGS. 6(a) and 6(b), into the table formed in the memory 12.

FIG. 7 shows an example of frequencies of terms occurring in the text data having its document information segmented into terms or morphemes such as those shown in FIG. 5.

FIG. 8 shows the frequencies of all the terms occurring in the text data having its document information segmented into terms or morphemes such as those shown in FIG. 5. From consideration of the rate—at which the terms cooccur with the cooker, as expressed—on the basis of the values of frequencies such as those shown in FIG. 8, words which are not directly related to the related terms, e.g., postpositional particles or punctuation marks such as "の (NO)," "は (HA)," or "。 (PUNCTUATION MARK)" appear at high frequencies.

The CPU 11 controls the memory 12 or the hard disk 13 in such a way as to hold data regarding the frequencies f(ωk), f(ωfi), f(ωbi), and f(ωi) that have been calculated.

From the information f(ωk) regarding the occurrence frequency of the specified term and from the information f(ωi) regarding the occurrence frequencies of the preceding and subsequent terms in the text data, all of which are received from the frequency calculation unit 22, the CPU 11, which serves as the probability-of-occurrence calculation unit 23, is capable of calculating the occurrence probability of the preceding term and that of the subsequent term, as well as the occurrence probability of the keyword.

At the time of calculation of occurrence probability of a term, the CPU 11 utilizes the data calculated by the frequency calculation unit 22. More specifically, in association with memory the CPU 11 processes information corresponding to the data.

The CPU 11 holds in the memory 12 or the hard disk 13 the information about occurrence probability thus calculated.

From the information regarding the occurrence frequencies of the preceding and subsequent terms extracted by the preceding-and-subsequent term extraction unit, which is received from the frequency calculation unit 22, the CPU 11, which serves as the probability-of-concurrence calculation unit 24, calculates the probability of the preceding term cooccurring with the keyword ωk, i.e., P(ωi, ωk) and the probability of the subsequent term cooccurring with the same, i.e., P(ωk, ωi).

From the information regarding the occurrence probability of the specified term P(ωk) and from the information regarding occurrence probability of the preceding and subsequent terms P(ωi), both of which are received from the probability-of-occurrence calculation unit 23, and the probability-of-concurrence P(ωi, ωk) and the probability-of-concurrence P(ωk, ωi), both of which are received from the probability-of-concurrence calculation unit 24, the CPU 11, which serves as the order-dependent degree-of-association calculation unit 25, calculates an order-dependent degree of association of the term prior to the keyword ωk, i.e., A(ωi, ωk), and an order-dependent degree of association of the term subsequent to the keyword, i.e., A(ωk, ωi).

At the time of calculation of the order-dependent degree-of-association information items A(ωi, ωk) and A(ωk, ωi), the CPU 11 reads from the hard disk 13 or the memory 12 the information items P(ωi), P(ωk), P(ωi, ωk), and P(ωk, ωi) to be used for calculation.

The CPU 11 stores in the hard disk 13 or the memory 12 the order-dependent degree-of-association information items A(ωi, ωk) and A(ωk, ωi) thus calculated.

FIG. 9 is a table showing the degree of association of the keyword "日光 (NIKKO)" with the terms ωfi occurring prior to the keyword, i.e., A(ωi, ωk). FIG. 10 is a table showing the degree of association of the keyword "日光 (NIKKO)" with the terms ωfi occurring subsequent to the keyword, i.e., A(ωk, ωi). As shown in FIGS. 9 and 10, the information regarding the degree of association of a term with a keyword, such as that shown in FIGS. 9 and 10, is stored in the table of the memory 12 in such a way that terms are correlated with values.

From the order-dependent degree-of-association information items A(ωi, ωk) and A(ωk, ωi) received from the order-dependent degree-of-association calculation unit 25, the CPU 11, which serves as the order-independent degree-of-association calculation unit 26, calculates an order-independent degree of association of the preceding and subsequent terms with the keyword ωk, i.e., r(ωi, ωk).

The CPU 11 calculates the degree-of-association information r(ωi, ωk) by reading the information items A(ωi, ωk) and A(ωk, ωi), from the memory 12 or the hard disk 13 to be used for calculation.

FIG. 11 shows the degree-of-association information r(ωi, ωk) calculated by the CPU 11, which serves as the order-independent degree-of-association calculation unit 26 from the data shown in FIGS. 9 and 10.

The CPU 11 stores the degree-of-association information r(ωi, ωk) as shown in FIG. 11 into the table of the memory 12 in such a way that terms are correlated with values.

The CPU 11 serving as the term extraction unit 27 extracts a group of terms related to the keyword ωk, on the basis of the degree-of-association information r(ωi, ωk) calculated by the order-independent degree-of-association calculation unit 26.

At the time of extraction of a group of terms related to the keyword ωk from the text data, the CPU 11 uses the result calculated by the order-independent degree-of-association calculation unit 26.

For example, at the time of extraction of a group of terms having high degrees of occurrence, the CPU 11 outputs terms in decreasing order of numerical value by reference to values representing the degree of association as determined through use of the degree-of-association information r(ωi, ωk) calculated by the order-independent degree-of-association calculation unit 26.

More specifically, the CPU 11 outputs the top-five terms among the order-independent degree-of-association information items such as those shown in FIG. 11. The number of terms output by the CPU 11 can be determined by the designer or the maintainer. The following explanation is based on the assumption that, from the order-independent degree-of-association information item r(ωi, ωk), the CPU 11, which serves as the term group extraction unit 27, extracts and outputs the top ten terms or morphemes in decreasing order of numerical value.

The CPU 11, which serves as the term group extraction unit 27, can also control the memory 12 or the like in such a way as to hold a group of extracted terms. The following explanation is also based on the assumption that a list of extracted terms is held in the memory 12 or the like.

Upon receipt of a signal for seeking a list of terms related to the term "日光 (NIKKO)" from the system user, the CPU 11 determines whether or not information regarding a list of extracted terms is stored in the table of the memory 12. If such information exists, a related-term list can be output through use of such information.

Further, the CPU 11 is capable of performing control operations so as to display a group of extracted terms on a display screen or to print out the same.

The memory 12 or the hard disk 13, which serves as a storage unit, stores various computational results such as P(ωk), P(ωi, ωk), and r(ωi, ωk) or results of extraction such as frequency-of-appearance information items f(ωk) and f(ωfi). In some cases, a device which stores data such as the memory 12 or the hard disk 13 may be referred to as a "storage device."

With the foregoing configuration, the general-purpose computer 1 to which is installed the related term extraction apparatus according to the embodiment of the present invention becomes operative as a result of the related term extraction program being installed from a computer-readable recording medium such as a CD-ROM, to the main unit 1a of the computer.

The related term extraction program is intended to extract a group of terms related to the keyword ωk from the text data and comprises a sequence of numbered commands suitable for the computer 1 to execute the function of specifying a keyword (hereinafter may be referred to simply as a "keyword specification function"), the function of calculating the occurrence frequency of the specified term and the frequency of a term occurring prior to or subsequent to the specified term (hereinafter may be referred to simply as a "frequency calculation function"), the function of extracting terms occurring prior to and subsequent to the specified term (hereinafter may be referred to simply as a "preceding-and-subsequent term extraction function"), the function of calculating probabilities of the preceding and subsequent terms cooccurring with the specified term (hereinafter may be referred to simply as a "probability-of-concurrence calculation function"), the function of calculating the occurrence probabilities of the preceding and subsequent terms and the occurrence probability of the specified term (hereinafter may be referred to simply as a "probability-of-occurrence calculation function"), the function of calculating an order-dependent degree of association of the preceding and subsequent terms with the specified term (hereinafter may be referred to simply as a "order-dependent degree-of-association-of-terms calculation function"), the function of calculating an order-independent degree of association of the preceding and subsequent terms with the specified term (hereinafter may be referred to simply as a "order-independent degree-of-association calculation function"), the function of extracting a group of related terms (hereinafter may be referred to simply as a "term group extraction function"), and the function of segmenting a term (hereinafter may be referred to simply as a "term segmentation function").

The keyword specification function causes the computer 1 to specify a keyword for which related terms are extracted from text data. The term segmentation function causes the computer 1 to segment document information included in the text data on a per-term or per-morpheme basis. The preceding-and-subsequent term extraction function causes the computer 1 to extract the term ωfi occurring prior to the keyword ωk or the term ωbi occurring subsequent to the same in the text data. The frequency calculation function causes the computer 1 to calculate the occurrence frequencies f(ωi) and f(ωk).

The probability-of-occurrence calculation function causes the computer 1 to calculate the occurrence probability of the keyword ωk, i.e., P(ωk), and the occurrence probabilities of the preceding term ωfi and the subsequent term ωbi extracted by means of the preceding-and-subsequent term extraction function, i.e., P(ωfi) and P(ωbi). The probability-of-concurrence calculation function causes the computer 1 to calculate the probability of the preceding term ωfi, extracted by means of the preceding-and-subsequent term extraction function, cooccurring with the specified term, i.e., P(ωfi, ωk), and the probability of the subsequent term ωbi, extracted by means of the preceding-and-subsequent term extraction function, cooccurring with the specified term, i.e., P(ωk, ωbi). The order-dependent degree-of-association-of-terms calculation function causes the computer 1 to calculate an order-dependent degree of association of the preceding term ωfi with the keyword ωk, i.e., A(ωfi, ωk), and an order-dependent degree of association of the preceding term ωbi with the keyword ωk, i.e., A(ωk, ωbi), on the basis of the probability-of-concurrence P(ωi, ωk) and on the basis of the probability-of-concurrence P(ωk, ωi) calculated by means of the probability-of-occurrence calculation function and of the probability-of-occurrence information items P(ωk), P(ωfi), and P(ωbi) calculated by means of the probability-of-occurrence calculation function.

The order-independent degree-of-association calculation function causes the computer 1 to calculate the order-independent degrees of occurrence of the preceding term ωfi and the subsequent term ωbi with the keyword, i.e., r(ωi, ωk), on the basis of the degree-of-association information items A(ωfi, ωk) and A(ωk, ωbi) calculated by means of the order-dependent degree-of-association calculation function.

The term group extraction function causes the computer 1 to extract from the text data and outputting a group of terms related to the keyword ωk, on the basis of the degree-of-association information r(ωi, ωk) calculated by means of the order-dependent degree-of-association calculation function.

In association with the operations of the CPU 11 and the foregoing functions, specific operation procedures will be described on the basis of flowcharts provided in FIGS. 12 through 15.

Figure 12:
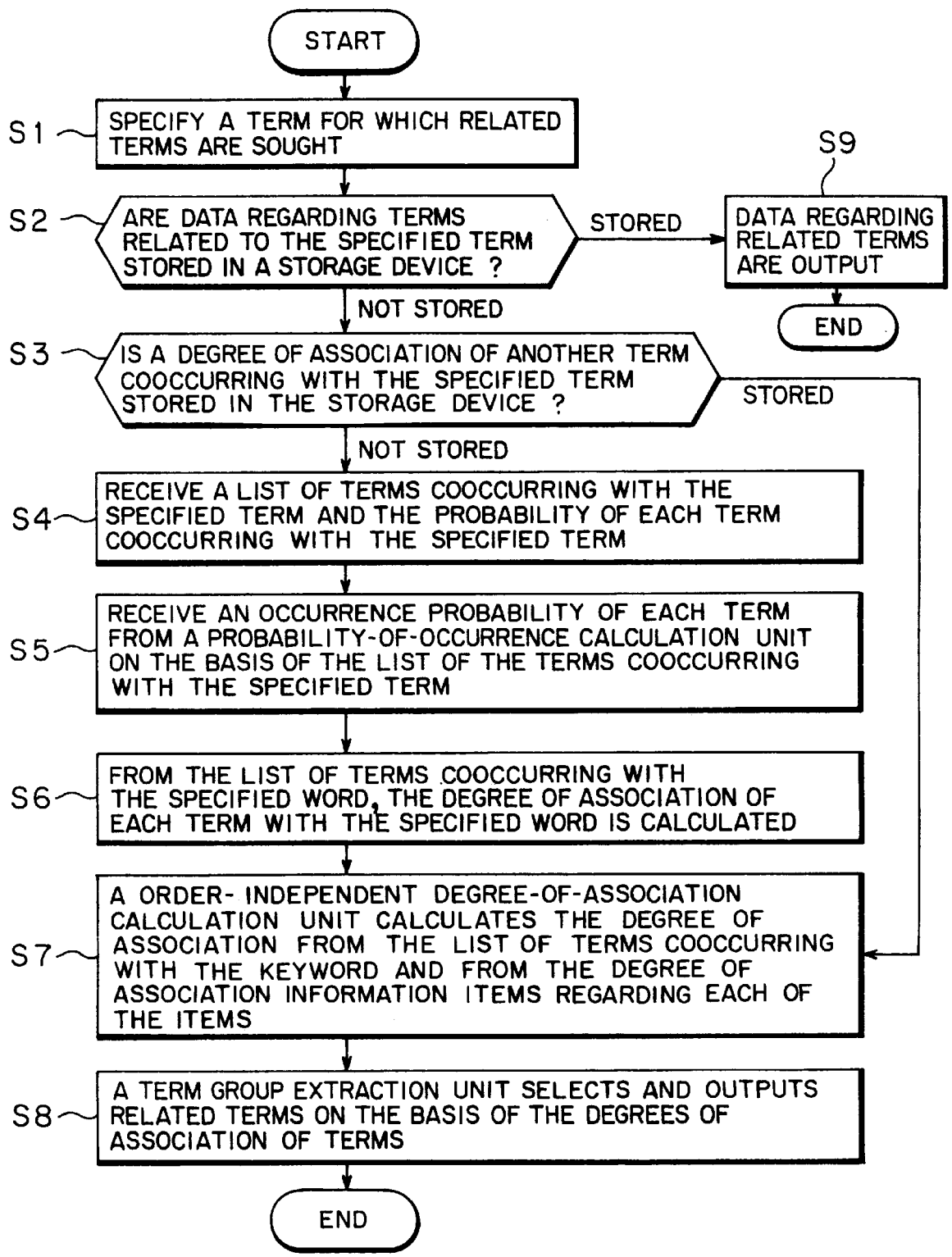
FIG. 12 is a flowchart showing the flow of processing operations required when a CPU executes a related term extraction program in a computer according to one embodiment of the present invention.

FIG. 12 is a flowchart showing the flow of processing operations required when the CPU 11 executes the related term extraction program in the general-purpose computer 1 according to the embodiment. As shown in FIG. 12, the CPU 11, which performs the keyword specification function, executes the related term extraction program de-archived into the memory 12, thus specifying a term (i.e., the keyword ωk) for which related terms are sought (step S1).

As a result of the user of the computer 1 operating the keyboard 1c at the time of specification of the keyword ωk, the CPU 11 receives an information signal relating to the keyword ωk, thus determining the keyword ωk. For example, in a case where the user extracts terms related to term "日 光 (NIKKO)" from the text data having their contents segmented into terms or morphemes such as the data shown in FIG. 5, when the user of the system sends information regarding the term "日 光 (NIKKO)" to the CPU 11 by operation of the keyboard 1c, the CPU 11 specifies the keyword as the term "日 光 (NIKKO)." In short, as a keyword specification step, the CPU 11 specifies a keyword for which related terms are extracted.

In a case where the CPU 11 has previously extracted terms related to the term "日 光 (NIKKO)," since data regarding the related terms are already stored in the storage device, the CPU 11 determines whether or not the data regarding the terms related to the term "日 光 (NIKKO)" are stored in the storage device (step S2).

More specifically, in order to make a decision as to whether or not data regarding terms related to the term "日 光 (NIKKO)"—whose related terms are sought—are in the memory 12 or the hard disk 13, the CPU 11 performs data processing to thus make a decision as to whether or not there are corresponding data, by de-archiving the data stored in the table of the memory 12.

In a case where the data regarding the terms related to the term "日 光 (NIKKO)" are stored in the storage device, the CPU 11 outputs these related terms (step S9).

The CPU 11 outputs the terms in decreasing order of degree-of-association r(ωi, ωk). For example, the CPU 11 is capable of sending to the display 1b an image display signal for the purpose of displaying a related-term list on the display 1b or for the purpose of controlling a printer so as to print out a related-term list (step S9).

The CPU 11 outputs the terms by correlating them with an order-independent degree of association such as that shown in FIG. 11, which has been described previously.

In contrast, if no data regarding terms related to the keyword ωk are stored in the storage device, the CPU 11 determines whether or not a ratio of occurrence of terms cooccurring with the term "日 光 (NIKKO)" (i.e., the degree-of-association information A(ωi, ωk)) is stored in the storage device (step S3).

If the ratio of occurrence of terms cooccurring with the term "日 光 (NIKKO)" is not stored in the storage device, the CPU 11 receives, from the CPU 11 which serves as the probability-of-concurrence calculation unit 24, a list of terms cooccurring with the keyword and the probability of each term cooccurring with the keyword, i.e., P(ωfi, ωk) and P(ωk, ωbi) (step S4). On the basis of the list of the terms cooccurring with the keyword, the CPU 11 receives from the probability-of-occurrence calculation unit 23 the occurrence probability of each term, i.e., P(ωfi) and P(ωbi) (step S5).

From the list of terms cooccurring with the keyword, the CPU 11, which performs the order-dependent degree-of-association-of-terms calculation function, calculates the ratio of occurrence of each term with the keyword (i.e., the degree-of-association information items A(ωi, ωk) and A(ωk, ωi)) (step S6).

As a result, the CPU 11 calculates the degree-of-association information items A(ωi, ωk) and A(ωk, ωi) such as those shown in FIGS. 9 and 10 and controls the memory 12 so as to hold computational results in its table in such a way that the degree of association is correlated with a term or a morpheme.

In other words, in an order-dependent degree-of-association-of-terms calculation step, the CPU 11 calculates the order-dependent degree of association of the preceding term with the keyword and the order-dependent degree of association of the subsequent term with the keyword, on the basis of the probability-of-concurrence information and the probability-of-occurrence information.

The CPU 11, which performs an order-independent degree-of-association-of-terms calculation function, calculates the degree of association, i.e., r(ωi, ωk), from the list of terms cooccurring with the keyword and from the degree-of-association information items A(ωi, ωk) and A(ωk, ωi) regarding each of the items (step S7).

Even in a case where no data regarding terms related to the term "日 光 (NIKKO)" are stored in the storage device, the CPU 11, which performs the order-dependent degree-of-association-of-terms calculation function, calculates the degree of association r(ωi, ωk), such as that shown in FIG. 11, from the degree-of-association information items A(ωi, ωk) and A(ωk, ωi), such as those shown in FIGS. 10 and 11.

In other words, in an order-dependent degree-of-association-of-terms calculation step, the CPU 11 calculates order-independent degrees of the preceding and subsequent terms occurring with the keyword $r(\omega i, \omega k)$ from the degree-of-association information items $A(\omega i, \omega k)$ and $A(\omega k, \omega i)$ calculated in the order-dependent degree-of-association calculation step.

The CPU 11, which performs the term group extraction function, selects and outputs related terms on the basis of the degree of association $r(\omega i, \omega k)$ (step S8). Here, the CPU 11 outputs the top ten terms or morphemes among the order-independent degree of association $r(\omega i, \omega k)$ such as that shown in FIG. 11.

In other words, in a term group extraction step, the CPU 11 extracts from the text data a group of terms related to the keyword, on the basis of the degree of association calculated in the order-independent degree-of-association-of-terms calculation step, and outputs the thus-extracted terms.

Figure 13:
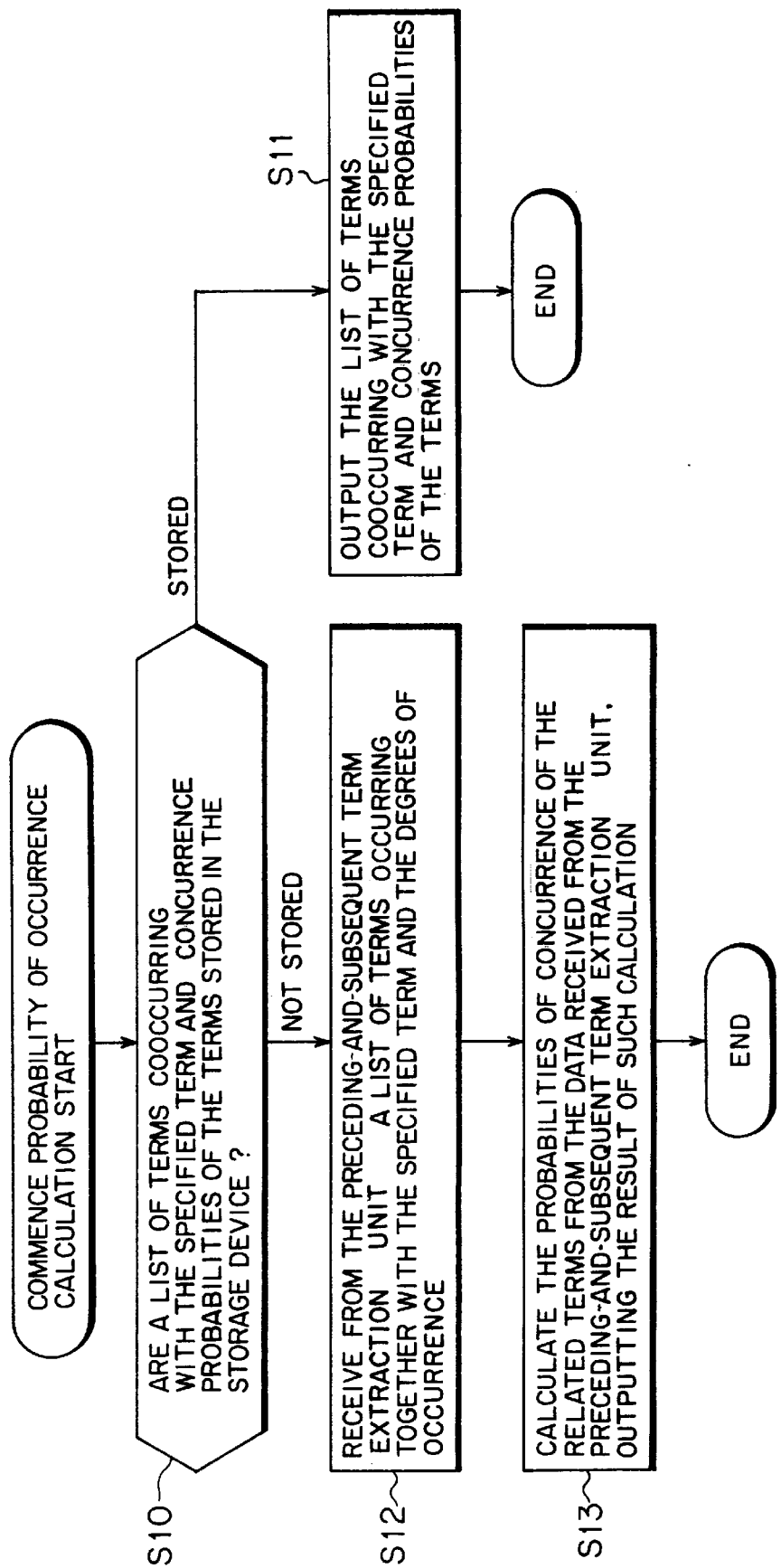
FIG. 13 is a flowchart depicting the flow of processing when the CPU, which performs a probability-of-concurrence calculation function, executes the related term extraction program in the computer according to one embodiment of the present invention.

FIG. 13 shows a flowchart depicting the flow of processing when the CPU 11, which performs the probability-of-concurrence calculation function, executes a program. As shown in FIG. 13, at the time of calculation of the probability-of-concurrence $P(\omega i, \omega k)$ and $P(\omega k, \omega i)$ of the term "日 光 (NIKKO)," the CPU 11, which performs the probability-of-concurrence calculation function, initially determines whether or not the probability-of-concurrence $P(\omega i, \omega k)$ and $P(\omega k, \omega i)$ to be sought is stored in the storage device (step S10).

In a case where the probabilities of concurrence $P(\omega i, \omega k)$ and $P(\omega k, \omega i)$ are stored in the storage device, the CPU 11, which performs the probability-of-concurrence calculation function, outputs the probabilities of concurrence $P(\omega i, \omega k)$ and $P(\omega k, \omega i)$ together with a list of terms related to the probabilities in such a way that the CPU 11, which performs the order-dependent degree-of-association-of-terms calculation, can calculate the probabilities (step S11).

The CPU 11, which performs the probability-of-concurrence calculation function, uses the probabilities of concurrence $P(\omega i, \omega k)$ and $P(\omega k, \omega i)$ output at the time of calculation of the degree-of-association information items $A(\omega i, \omega k)$ and $A(\omega k, \omega i)$ (step 6) from the CPU 11, which performs the probability-of-concurrence calculation function (step S11).

In contrast, in a case where the probabilities of concurrence $P(\omega i, \omega k)$ and $P(\omega k, \omega i)$ are not stored (or do not exist) in the storage device, the CPU 11, which performs the probability-of-concurrence calculation function, receives from the preceding-and-subsequent term extraction unit 21 data regarding a list of the preceding and subsequent terms $\omega fi$ and $\omega bi$ occurring together with the term "日 光 (NIKKO)," such as that shown in FIG. 6, and data regarding the occurrence frequencies of the keyword and the preceding and subsequent terms $f(\omega k)$, $f(\omega fi)$, and $f(\omega bi)$ (step S12).

From the frequency-of-appearance information items $f(\omega fi)$ and $f(\omega bi)$ regarding the preceding and subsequent terms $\omega fi$ and $\omega bi$ extracted as related terms by the preceding-and-subsequent term extraction unit 21, the CPU 11 calculates and outputs the probabilities of concurrence $P(\omega i, \omega k)$ and $P(\omega k, \omega i)$ (steps S13 and S4).

In other words, in a probability-of-concurrence calculation function step, the CPU 11 calculates the probabilities of the preceding and subsequent terms cooccurring with the keyword specified in the keyword specification step.

The CPU 11, which performs the order-dependent degree-of-association-of-terms calculation function, uses the probabilities of concurrence $P(\omega i, \omega k)$ and $P(\omega k, \omega i)$ output at the time of calculation of the order-dependent degree-of-association information items $A(\omega i, \omega k)$ and $A(\omega k, \omega i)$ (step S6) from the CPU 11, which performs the probability-of-concurrence calculation function (step S13).

Figure 14:
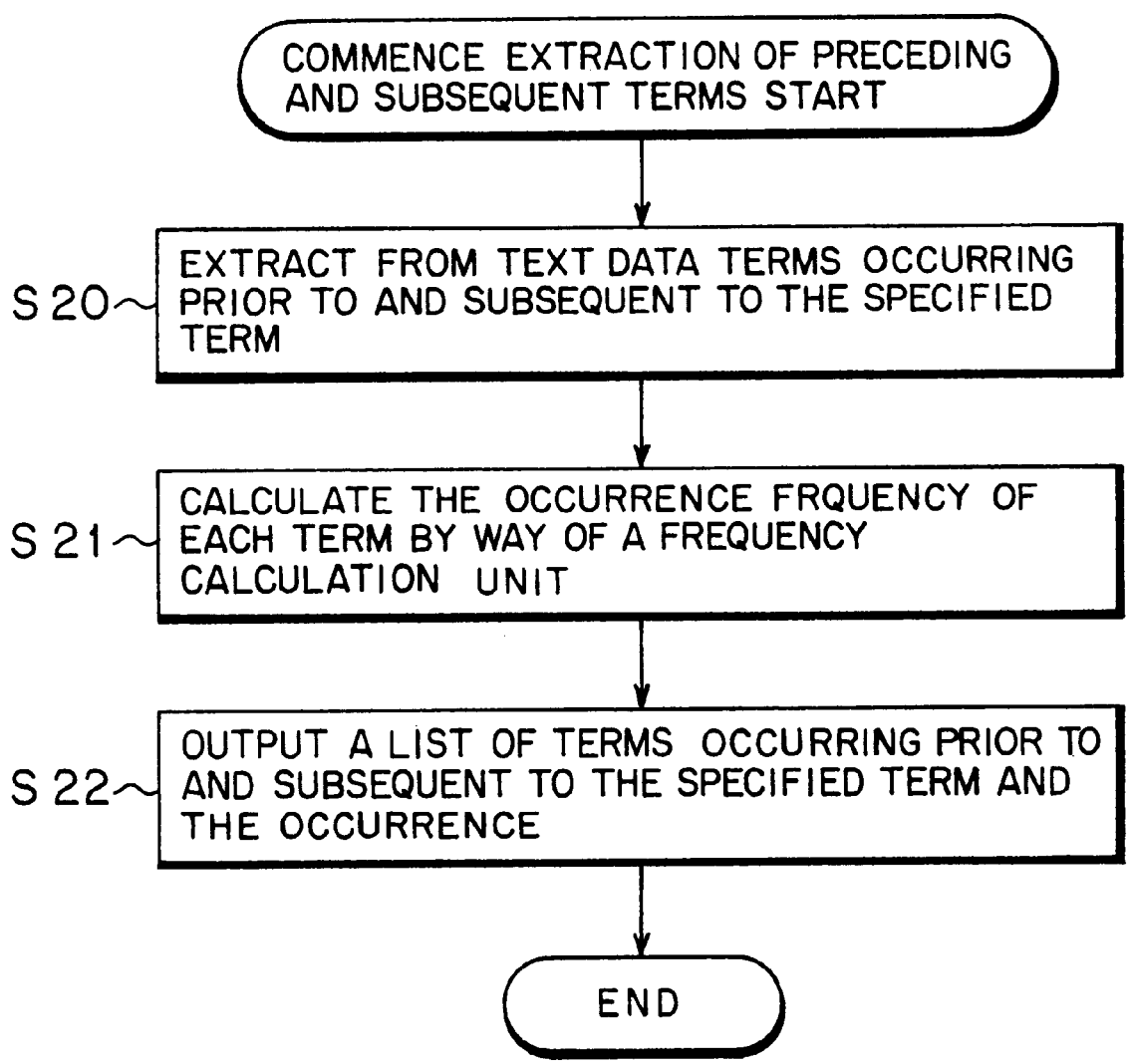
FIG. 14 is a flowchart depicting the flow of processing when the CPU, which serves as a preceding-and-subsequent term extraction unit, executes the related term extraction program in the computer according to one embodiment of the present invention.

FIG. 14 is a flowchart showing the flow of processing when the CPU 11, which serves as the preceding-and-subsequent term extraction unit 21, executes the related term extraction program. As shown in FIG. 14, the CPU 11, which serves as the preceding-and-subsequent term extraction unit 21, extracts from the text data the terms $\omega fi$ and $\omega bi$ occurring before and after the term "日 光 (NIKKO)," such as those shown in FIGS. 6(a) and 6(b) (step S20).

In other words, in a preceding-and-subsequent term extraction step, the CPU 11 extracts a term occurring prior to the keyword in the text data and a term occurring subsequent to the keyword in the same.

The CPU 11 receives from the frequency calculation unit 22 the frequency-of-appearance information items $f(\omega fi)$ and $f(\omega bi)$ regarding the preceding and subsequent terms $\omega fi$ and $\omega bi$ extracted from the text as related terms (step S21). The CPU 11 then outputs lists of terms $\omega fi$ and $\omega bi$ occurring before and after the keyword $\omega k$ such as those shown in FIGS. 6(a) and 6(b), and the frequency-of-appearance information items $f(\omega fi)$ and $f(\omega bi)$ received from the frequency calculation unit 22 (step S22).

The CPU 11, which performs the probability-of-concurrence calculation function, calculates the probabilities of concurrence $P(\omega i, \omega k)$ and $P(\omega, \omega i)$ from the lists of terms $\omega fi$ and $\omega bi$ and the frequency-of-appearance information items $f(\omega fi)$ and $f(\omega bi)$ output (in step S22) from the frequency calculation unit 22 (step S13).

Figure 15:
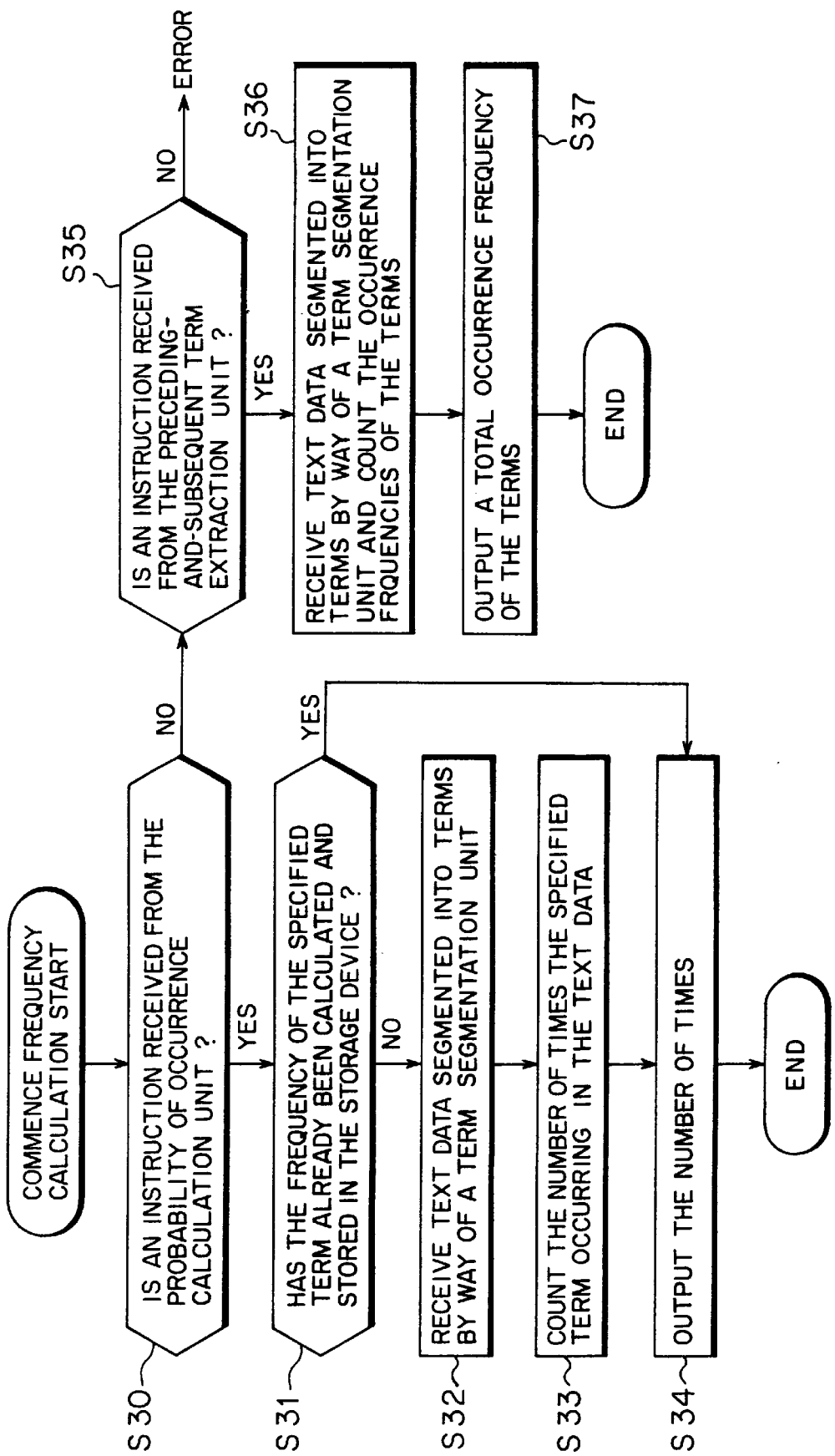
FIG. 15 is a flowchart depicting the flow of processing when the CPU, which serves as a frequency calculation unit, executes the related term extraction program in the computer according to one embodiment of the present invention.

FIG. 15 is a flowchart showing the flow of processing when the CPU 11, which serves as the frequency calculation unit 22, executes the related term extraction program. As shown in FIG. 15, the CPU 11, which performs the frequency calculation function, determines whether or not a received instruction is output from the probability-of-occurrence calculation unit 23 (step S30). If the instruction is received from the probability-of-occurrence calculation unit 23, the CPU 11 determines whether or not the frequency-of-appearance information item $f(\omega k)$ regarding the keyword $\omega k$ is stored in the storage device (step S31).

If the keyword $\omega k$ is not stored in the storage device, the CPU 11, which performs the frequency calculation function, receives the information segmented into a per-term or per-morpheme basis (step S32) and calculates the frequency of the keyword $\omega k$ occurring in the text data (or the number of times the keyword appear in the same) (step S33), outputting a calculation result (step S34).

The CPU 11, which performs the term segmentation function, separates the text data—whose contents are not segmented into terms or morphemes such as those shown in FIG. 4—on a per-term or per-morpheme basis in a manner shown in FIG. 5. In other words, in a term segmentation step, the CPU 11 separates the text data on a per-term or per-morpheme basis before extracting preceding and subsequent terms in the preceding-and-subsequent term extraction step.

Although not shown in FIG. 15, the CPU 11, which performs the term segmentation function, also calculates the number of times the preceding and subsequent terms $\omega fi$, $\omega bi$ occurring in the text data, the terms being extracted by the CPU 11, which performs the preceding-and-subsequent term extraction function.

In other words, in a probability-of-occurrence calculation step, the CPU 11 calculates the occurrence probability of the keyword specified in the keyword specification step, as well as the occurrence probability of the preceding term extracted in the preceding-and-subsequent term extraction step and the occurrence probability of the subsequent term extracted in the same.

In the probability-of-occurrence calculation, the CPU 11 calculates the occurrence probabilities P($\omega$k) and P($\omega$i) from the frequency-of-appearance information items f($\omega$k) and f($\omega$i).

If the instruction is not received from the probability-of-occurrence calculation unit 23, the CPU 11, which serves as the frequency calculation unit 22, determines whether or not the instruction is received from the preceding-and-subsequent term extraction unit 21 (step S35).

If the instruction is received from the preceding-and-subsequent term extraction unit 21, the CPU 11, which serves as the frequency calculation unit 22, receives the data-which are segmented into terms by the CPU 11, which performs the term segmentation function, segmenting the text data received from the preceding-and-subsequent term extraction unit 21—and counts the frequencies of terms included in the data (step S36). The frequencies of the terms that have been aggregated are output to the probability-of-occurrence calculation unit 23 (step S37).

If the CPU 11, which serves as the frequency calculation unit 22, determines that the instruction has not been received from the preceding-and-subsequent term extraction unit 21, the instruction signal is handled as an error.

The flow (not shown) of processing of the CPU 11 which serves as the probability-of-occurrence calculation unit 23 is as follows. More specifically, as a result of execution of the related term extraction program, the CPU determines whether or not the information regarding the occurrence probability P($\omega$i) to be sought is stored in the storage device. If the information is not stored in the storage device, the CPU receives from the frequency calculation unit 22 the information items f($\omega$fi), f($\omega$bi), and f($\omega$k) regarding the occurrence frequencies of terms and calculates the occurrence probabilities P($\omega$bi) and P($\omega$k). The computational results P($\omega$bi) and P($\omega$k) are output.

In contrast, if the occurrence probability P($\omega$i) to be sought, such as P($\omega$bi) and P($\omega$k), is stored in the storage device, the CPU 11, which serves as the probability-of-occurrence calculation unit 23, outputs the occurrence probability to the probability-of-concurrence calculation unit 24.

In other words, the general-purpose computer 1 extracts related terms from the text data through execution of the keyword specification step, the preceding-and-subsequent term extraction step, the probability-of-concurrence calculation step, the probability-of-occurrence calculation step, the order-dependent degree-of-association calculation step, the order-independent degree-of -association calculation step, the term group extraction step, and the term segmentation step.

As mentioned previously, in the general-purpose computer 1 which serves as the related term extraction apparatus according to the embodiment of the present invention, the CPU 11 calculates a sum of the square of the order-dependent degree of association of the preceding term with the keyword A($\omega$i, $\omega$k) and the square of the order-dependent degree of association of the subsequent term with the keyword A($\omega$k, $\omega$i), and calculates the square root of the sum. Through use of the thus-obtained square root, the computer is capable of extracting in a highly accurate manner related terms which are easily understood by the user.

Further, in the general-purpose computer 1 which serves as the related term extraction apparatus according to the embodiment of the present invention, since the general-purpose computer 1 comprises the term segmentation unit 28, the computer can process a text that is not segmented on a per-term basis (e.g., a document written in Japanese or Chinese) while the text is segmented into terms or morphemes (in the term group extraction step). Accordingly, even if the text is not previously provided with information about parts of speech, related terms can be readily extracted even from a document written in Japanese or the like.

Further, in the general-purpose computer 1 which serves as the related term extraction apparatus according to the embodiment of the present invention, since the general-purpose computer 1 is provided with the storage unit, for example, the hard disk 13, information calculated through the processing executed by the frequency calculation unit 22, the order-dependent degree-of-association calculation unit 25 or the like are stored in the storage unit. Accordingly, the speed of processing associated with extraction of related terms can be increased, and a related-term list can be prepared without dependence on the sequence in which terms appear.

Still further, in the general-purpose computer 1 which serves as the related term extraction apparatus according to the embodiment of the present invention, even in a case where the computer 1 performs the keyword specification function, the preceding-and-subsequent term extraction function, the probability-of-concurrence calculation function, the probability-of-occurrence calculation function, the order-dependent degree-of-association calculation function, the order-independent degree-of-association calculation function, the term group extraction function, and the term segmentation function, the CPU 11 calculates a sum of the square of the order-dependent degree of association of the preceding term with the keyword A($\omega$i, $\omega$k) and the square of the order-dependent degree of association of the subsequent term with the keyword A($\omega$k, $\omega$i) and calculates the square root of the sum. Through use of the thus-obtained square root, the computer is capable of extracting in a highly accurate manner related terms which are easily understood by the user.

Yet further, in the general-purpose computer 1 which serves as the related term extraction apparatus according to the embodiment of the present invention, even when the computer 1 executes the term segmentation function as the related term extraction program, the computer is capable of processing a text not segmented on a per-term basis (e.g., a document written in Japanese or Chinese) while the text is segmented into terms or morphemes. Accordingly, even if the text is not previously provided with information about parts of speech, related terms can be readily extracted even from a document written in Japanese or the like.

(b1) Description of a First Modification of the Embodiment

Figure 16:
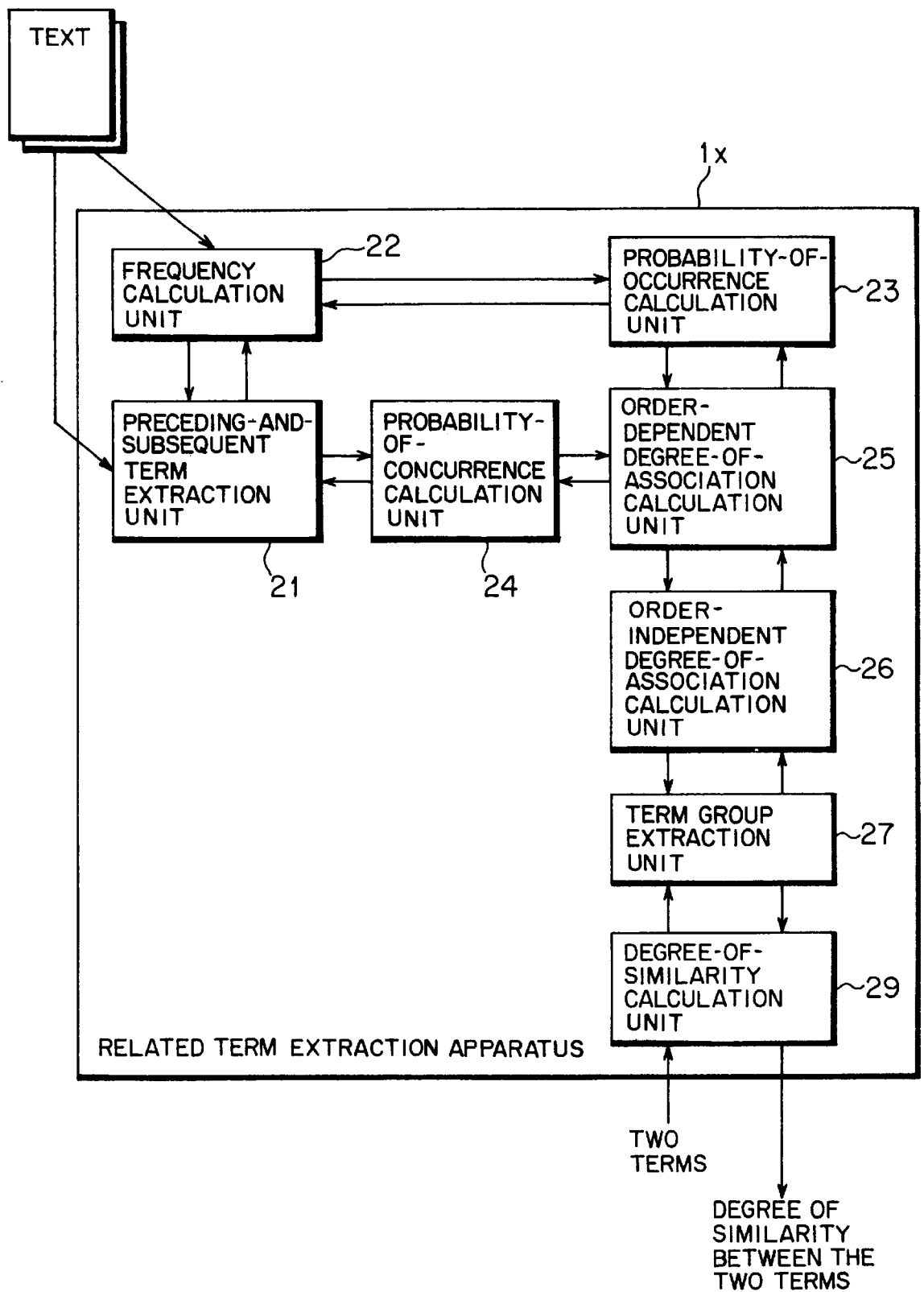
FIG. 16 is a block diagram showing a general-purpose computer to which is installed a related term extraction apparatus according to a first modification of the embodiment of the present invention.

FIG. 16 is a block diagram showing a general-purpose computer 1x to which is installed a related term extraction apparatus according to a first modification of the embodiment of the present invention. As shown in FIG. 16, the computer 1x comprises the frequency calculation unit 22, the preceding and-subsequent term extraction unit 21, the probability-of-concurrence calculation unit 24, the probability-of-occurrence calculation unit 23, the order-dependent degree-of-association calculation unit 25, the order-independent degree-of-association calculation unit 26, the term group extraction unit 27, a term segmentation unit (not shown), a storage unit (not shown), and a degree-of-similarity calculation unit 29.

The computer 1x has the same hardware configuration as that of the computer 1 shown in FIGS. 1 and 2 mentioned previously.

Since elements are assigned the same reference numerals as those used in the embodiment explanation unit (b) and operate in the same manner, their explanations will be omitted here.

The degree-of-similarity calculation unit (a degree-of-similarity calculation means) 29 calculates a degree of similarity between at least two terms, or keywords, through use of groups of terms extracted by the term group extraction unit 27 as being related to the respective terms.

The following explanation is based on the assumption that a degree of similarity between two terms is calculated. However, the same applies to calculation of a degree of similarity among more than three terms.

The preceding-and-subsequent term extraction unit 21 extracts a preceding term occurring prior to a specified term or a subsequent term occurring subsequent to the same in text data. From information regarding the occurrence frequency of the specified term and from information regarding the occurrence frequencies of the preceding and subsequent terms in the text data, both of which are received from the frequency calculation unit 22, the probability-of-occurrence calculation unit 23 is capable of calculating the occurrence probability of the preceding term and the occurrence probability of the subsequent term together with the occurrence probability of the specified term.

From the information regarding the occurrence frequency of the preceding term extracted by the preceding-and-subsequent term extraction unit 21 and from the information regarding the occurrence frequency of the subsequent term extracted by the preceding-and-subsequent term extraction unit 21, both of which are received from the frequency calculation unit 22, the probability-of-concurrence calculation unit 24 calculates the probabilities of the preceding and subsequent terms cooccurring with the specified term. From information regarding the occurrence probability of the specified term, from that of the preceding term, and from that of the subsequent term, all of which are received from the probability-of-occurrence calculation unit 23, as well as from information regarding the probability of the preceding term cooccurring with the specified term and information regarding the probability of the subsequent term cooccurring with the specified term, both of which are received from the probability-of-concurrence calculation unit 24, the order-dependent degree-of-association unit 25 calculates order-dependent degrees of occurrence of the preceding and subsequent terms with the specified term.

From information regarding the degree of association received from the order-dependent degree-of-association calculation unit 25, the order-independent degree-of-association calculation unit 26 calculates order-independent degrees of the preceding and subsequent terms occurring with the specified term.

On the basis of the degree-of-association information calculated by the order-independent degree-of-association calculation unit 26, the term group extraction unit 27 extracts from the text data a group of terms related to the specified term. The storage unit (not shown) stores at least one of computational results or extraction results related to a specified term. The term segmentation unit (not shown) segments text data on a per-term or per-morpheme basis.

The foregoing units, the CPU 11, the main memory 12, the hard disk 13, and other elements will now be explained in association with one another.

The CPU 11, which serves as the degree-of-similarity calculation unit 29, calculates a degree of similarity between two keywords through use of groups of terms extracted by the term group extraction unit 27 as being related to the respective keywords.

Here, the following explanation is based on the assumption that the CPU 11, which serves as the degree-of-similarity calculation unit 29, can calculate and determine a degree of similarity among three terms "自動車 (JIDOSHA; automobile)," "車 (KURUMA; car)," and "航空機 (KOKUKI; aircraft)."

As mentioned for Unit (b), the CPU 11 is formed so as to serve as the frequency calculation unit 22, the preceding-and-subsequent term extraction unit 21, the probability-of-concurrence calculation unit 24, the probability-of-occurrence calculation unit 23, the order-dependent degree-of-association calculation unit 25, the order-independent degree-of-association calculation unit 26, the term group extraction unit 27, and the term segmentation unit. The memory 12 and the hard disk 13 are formed so as to serve as a storage unit.

FIGS. 17 through 19 show lists of related terms extracted from text data by the term group extraction unit 27 on the basis of the order-independent degree of association r(ωi, ωk). FIG. 17 shows a list of terms related to the term "自動車 (JIDOSHA; automobile)," and FIG. 18 shows a list of terms related to the term "車 (KURUMA; car)." FIG. 19 shows a list of terms related to the term "航空機 (KOKUKI; aircraft)."

The CPU 11, which serves as the degree-of-similarity calculation unit 29, calculates a degree of similarity among the terms "自動車 (JIDOSHA; automobile)," "車 (KURUMA; car)," and "航空機 (KOKUKI; aircraft)" through use of the lists of related terms such as those shown in FIGS. 17 through 19.

More specifically, the CPU 11, which serves as the degree-of-similarity calculation unit 29, calculates the sum of scalar products of the related terms in such a manner as shown in FIGS. 17 through 19.

For example, at the time of calculation of a degree of similarity between the terms "自動車 (JIDOSHA; automobile)" and "車 (KURUMA; car)," the CPU 11, which serves as the degree-of-similarity calculation unit 29, calculates a scalar product between a term "MOSS (MOSU)" in the list of terms related to the term "自動車 (JIDOSHA; automobile)," which is shown in FIG. 17, and a term "はしご (HASHIGO; ladder)" in the list of terms related to the term "車 (KURUMA; car)," which is shown in FIG. 18.

Specifically, the CPU 11, which serves as the degree-of-similarity calculation unit 29, defines each related term to be a vector having a magnitude of degree-of-association information item r(ωi, ωk) and calculates the sum of scalar products of the related terms. A numerical value representing the sum of scalar products designates a degree of similarity among the terms.

At the time of calculation of a scalar product of the related terms, the CPU 11 defines the vectors to be oriented in the same direction (θ=0°). In contrast, at the time of calculation of a scalar product of different related terms, the CPU 11 defines the vectors to be oriented at right angles (θ=90°). Since the term "MOSS (MOSU)" in the list of terms related to the term "自動車 (JIDOSHA; automobile)" and the term "はしご (HASHIGO; ladder)" in the list of terms related to the term "車 (KURUMA; car)" are different from each other, the CPU 11 calculates a scalar product of these terms as zero.

Accordingly, the CPU 11, which serves as the degree-of-similarity calculation unit 29, calculates a degree of similarity between the terms "自動車 (JIDOSHA; automobile)" and "車 (KURUMA; car)" by using a degree of association of a term shared between the list of terms related to the term "自動車 (JIDOSHA; automobile)," which is shown in FIG. 17, and the list of terms related to the term "車 (KURUMA; car)," which is shown in FIG. 18. For example, the CPU uses degrees of occurrence of a related term "BMW (BIEMUDABRYU)" shared between the lists: that is, a degree of association of "12.4" and a degree of association of "12.0," and calculates a product of these two degrees of occurrence: that is, a scalar product of "148.8." A degree of similarity between the foregoing two terms is calculated from the sum of a scalar product of 148.8 and a scalar product of occurrence degrees of another related term shared between the two terms.

FIG. 20 shows a degree of similarity between the terms "自動車 (JIDOSHA; automobile)" and "車 (KURUMA; car)" and that between the terms "自動車 (JIDOSHA; automobile)" and "航空機 (KOKUKI; aircraft)." As shown in FIG. 20, the degree of similarity between "自動車 (JIDOSHA; automobile)" and "車 (KURUMA; car)" is 2839.4, and the degree of similarity between "自動車 (JIDOSHA; automobile)" and "航空機 (KOKUKI; aircraft)" is 814.4. From these values, it is understood that the term "自動車 (JIDOSHA; automobile)" is analogous to the term "車 (KURUMA; car)" rather than to the term "航空機 (KOKUKI; aircraft)."

With the foregoing configuration, the general-purpose computer $1x$ according to the first modification of the embodiment of the present invention becomes operative as a result of the related term extraction program being installed from a computer-readable recording medium, such as a CD-ROM, to the main unit $1a$ of the computer.

The related term extraction program is intended to cause the general-purpose computer $1x$ to extract from text data a group of terms related to the keyword and comprises a sequence of numbered commands suitable for the computer $1x$ to execute the keyword specification function, the frequency calculation function, the preceding-and-subsequent term extraction function, the probability-of-concurrence calculation function, the probability-of-occurrence calculation function, the order-dependent degree-of-association-of-terms calculation function, the order-independent degree-of-association calculation function, the term group extraction function, the term segmentation function, and a function of calculating a degree of similarity (hereinafter may be referred to simply as a "degree-of-similarity calculation function").

The degree-of-similarity calculation function causes the computer $1x$ to calculate a degree of similarity between two terms, or keywords, through use of groups of terms extracted by means of the term group extraction function as being related to these two respective terms.

The keyword specification function causes the computer $1x$ to specify a keyword for which related terms are extracted from text data. The term segmentation function causes the computer $1x$ to segment document information included in the text data on a per-term or per-morpheme basis. The preceding-and-subsequent term extraction function causes the computer $1x$ to extract the term $\omega fi$ occurring prior to the keyword $\omega k$ or the term $\omega bi$ occurring subsequent to the same in the text data. The frequency calculation function causes the computer $1x$ to calculate the occurrence frequencies $f(\omega i)$ and $f(\omega k)$.

The probability-of-occurrence calculation function causes the computer $1x$ to calculate the occurrence probability of the keyword $\omega k$, i.e., $P(\omega k)$, and the occurrence probabilities of the preceding term $\omega fi$ and the subsequent term $\omega bi$ extracted by means of the preceding-and-subsequent term extraction function, i.e., $P(\omega fi)$ and $P(\omega bi)$. The probability-of-concurrence calculation function causes the computer $1x$ to calculate the occurrence probability of the preceding term $\omega fi$, extracted by means of the preceding-and-subsequent term extraction function, cooccurring with the specified term, i.e., $P(\omega fi, \omega k)$, and the occurrence probability of the subsequent term $\omega bi$, extracted by means of the preceding-and-subsequent term extraction function, cooccurring with the specified term, i.e., $P(\omega k, \omega bi)$. The order-dependent degree-of-association-of-terms calculation causes the computer $1x$ to calculate an order-dependent degree of association of the preceding term $\omega fi$ with the keyword $\omega k$, i.e., $A(\omega fi, \omega k)$, and an order-dependent degree of association of the preceding term $\omega bi$ with the keyword $\omega k$, i.e., $A(\omega k, \omega bi)$, on the basis of the probability-of-concurrence $P(\omega i, \omega k)$ and on the basis of the probability-of-concurrence $P(\omega k, \omega i)$ calculated by means of the probability-of-occurrence calculation function and of the probability-of-occurrence information items $P(\omega k)$, $P(\omega fi)$, and $P(\omega bi)$ calculated by means of the probability-of-occurrence calculation function.

The order-independent degree-of-association calculation function causes the computer $1x$ to calculate the order-independent degrees of the preceding and subsequent terms occurring with a keyword, i.e., $r(\omega i, \omega k)$, on the basis of the degree-of-association information items $A(\omega fi, \omega k)$ and $A(\omega k, \omega bi)$ calculated by means of the order-dependent degree-of-association calculation function.

The term group extraction function causes the computer $1x$ to extract from the text data and outputting a group of terms related to the keyword $\omega k$, on the basis of the degree-of-association information $r(\omega i, \omega k)$ calculated by means of the order-dependent degree-of-association calculation function.

In association with the operations of the CPU 11 and the foregoing functions, specific operation procedures will be described. The CPU 11, which performs the degree-of-similarity calculation function, calculates a degree of similarity from the degree-of-association $r(\omega i, \omega k)$ regarding the terms "自動車 (JIDOSHA; automobile)," "車 (KURUMA; car)," and "航空機 (KOKUKI; aircraft)" calculated by means of the order-independent degree-of-association calculation function, such as that shown in FIGS. 17 through 19.

More specifically, the CPU 11, which performs the degree-of-similarity calculation function, calculates the sum of scalar products of the related terms in such a manner as shown in FIGS. 17 through 19.

Specifically, the CPU 11, which serves as the degree-of-similarity calculation unit 29, defines each related term to be a vector having a magnitude of degree-of-association information item $r(\omega i, \omega k)$ and calculates the sum of scalar products of the related terms. A numerical value representing the sum of scalar products designates a degree of similarity among the terms.

At the time of calculation of a scalar product of the related terms, the CPU 11 defines the vectors to be oriented in the same direction ($\theta=0°$). In contrast, at the time of calculation of a scalar product of different related terms, the CPU 11 defines the vectors to be oriented at right angles ($\theta=90°$). For example, since the term "MOSS (MOSU)" in the list of terms related to the term "自動車 (JIDOSHA; automobile)" and the term "はしご (HASHIGO; ladder)" in the list of terms related to the term "車 (KURUMA; car)" are different from each other, the CPU 11 calculates a scalar product of these terms as zero.

Accordingly, the CPU 11, which performs the degree-of-similarity calculation function, calculates a degree of similarity between the terms "自動車 (JIDOSHA; automobile)" and "車 (KURUMA; car)" by using a degree of association of a term shared between the list of terms related to the term "自動車 (JIDOSHA; automobile)," which is shown in FIG. 17, and the list of terms related to the term "車 (KURUMA; car)," which is shown in FIG. 18. For example, the CPU uses degrees of occurrence of a related term "BMW (BIEMUDABRYU)" shared between the lists: that is, a degree of association of "12.4" and a degree of association of "12.0," and calculates a product of these two degrees of occurrence: that is, a scalar product of "148.8." A degree of similarity between the foregoing two terms is calculated from the sum of a scalar product of 148.8 and a scalar product of occurrence degrees of another related term shared between the two terms. As shown in FIG. 20, the degree of similarity between "自動車 (JIDOSHA; automobile)" and "車 (KURUMA; car)" is 2839.4, and the degree of similarity between "自動車 (JIDOSHA; automobile)" and "航空機 (KOKUKI; aircraft)" is 814.4.

In other words, in a step for calculating a degree of similarity between terms (hereinafter may be referred to simply as a "degree-of-similarity calculation step"), after having extracted groups of terms related to the respective three terms "自動車 (JIDOSHA; automobile)," "車 (KURUMA; car)," and "航空機 (KOKUKI; aircraft)," which have been specified as the keywords in the term group extraction step, the CPU 11 calculates the degree of similarity between the two terms "自動車 (JIDOSHA; automobile)" and "車 (KURUMA; car)" and the degree of similarity between "自動車 (JIDOSHA; automobile)" and "航空機 (KOKUKI; aircraft)" among the groups of terms related to the terms "自動車 (JIDOSHA; automobile)," "車 (KURUMA; car)," and "航空機 (KOKUKI; aircraft)."

The CPU 11 performs operations such as those shown in FIGS. 12 through 15 as the keyword specification function, the frequency calculation function, the preceding-and-subsequent term extraction function, the probability-of-concurrence calculation function, the probability-of-occurrence calculation function, the order-dependent degree-of-association calculation function, the order-independent degree-of-association calculation function, the term group extraction function, and the term segmentation function.

In other words, the general-purpose computer 1x extracts related terms from text data through execution of the keyword specification step, the preceding-and-subsequent term extraction step, the probability-of-concurrence calculation step, the probability-of-occurrence calculation step, the order-dependent degree-of-association calculation step, the order-independent degree-of-association calculation step, the term group extraction step, the term segmentation step, and the degree-of-similarity calculation step.

As mentioned previously, in the general-purpose computer 1x to which is installed the related term extraction apparatus according to the first modification of the embodiment of the present invention, in addition to the extraction of related terms previously mentioned for unit (b), the CPU 11 can determine the term "自動車 (JIDOSHA; automobile)" to be analogous to the term "車 (KURUMA; car)" rather than to the term "航空機 (KOKUKI; aircraft)," on the basis of a square root of a sum of the square of the order-dependent degree of association of the preceding term with the keyword A(ωi, ωk) and the square of the order-dependent degree of association of the subsequent term with the keyword A(ωk, ωi), without use of a thesaurus or other knowledge base. In addition, the CPU can calculate a degree of similarity between terms which are newly used (the degree-of-similarity calculation step).

(b2) Description of a Second Modification of the Embodiment

Figure 21:
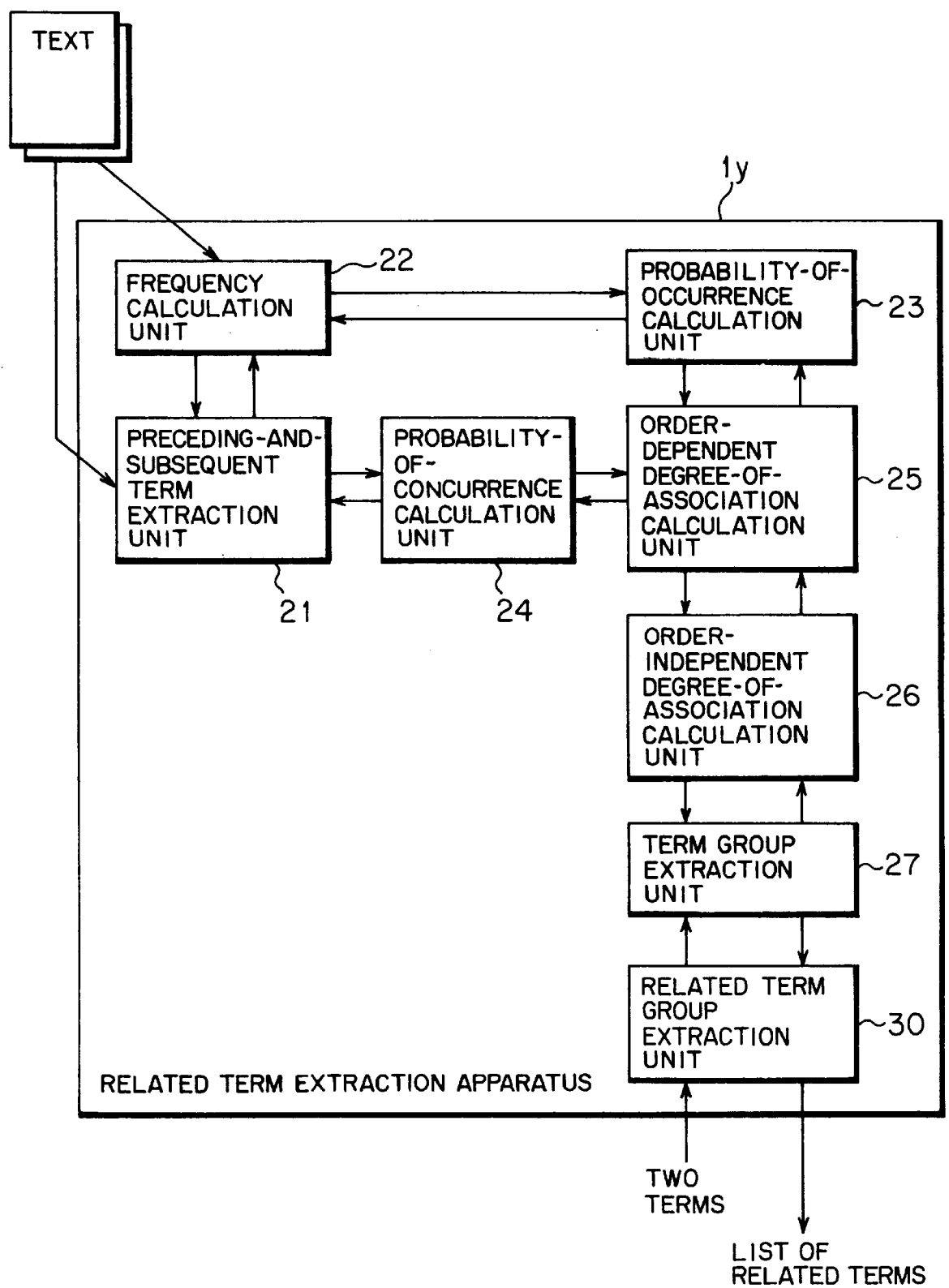
FIG. 21 is a block diagram showing a general-purpose computer to which is installed a related term extraction apparatus according to a second modification of the embodiment of the present invention.

FIG. 21 is a block diagram showing a general-purpose computer 1y to which is installed a related term extraction apparatus according to a second modification of the embodiment of the present invention. As shown in FIG. 21, the computer 1y comprises the frequency calculation unit 22, the preceding-and-subsequent term extraction unit 21, the probability-of-concurrence calculation unit 24, the probability-of-occurrence calculation unit 23, the order-dependent degree-of-association calculation unit 25, the order-independent degree-of-association calculation unit 26, the term group extraction unit 27, a term segmentation unit (not shown), a storage unit (not shown), and a related term group extraction unit 30.

The computer 1y has the same hardware configuration as that of the computer 1 shown in FIGS. 1 and 2 mentioned previously.

Since elements are assigned the same reference numerals as those used in the embodiment explanation unit (b) and operate in the same manner, their explanations will be omitted here.

The related term group extraction unit (a related term group extraction means) 30 extracts a group of terms related to all of the at least two terms through use of groups of terms extracted by the term group extraction unit 27 as being related to the two respective terms.

The following explanation is based on the assumption that the related term group extraction unit 30 extracts a group of terms related to two terms. However, the same applies to extraction of a group of terms related to three or more terms.

The preceding-and-subsequent term extraction unit 21 extracts a preceding term occurring prior to a specified term or a subsequent term occurring subsequent to the same in text data. From information regarding the occurrence frequency of the specified term and from information regarding the occurrence frequencies of the preceding and subsequent terms in the text data, both of which are received from the frequency calculation unit 22, the probability-of-occurrence calculation unit 23 is capable of calculating the occurrence probability of the preceding term and the occurrence probability of the subsequent term together with the occurrence probability of the specified term.

From the information regarding the occurrence frequency of the preceding term extracted by the preceding-and-subsequent term extraction unit 21 and from the information regarding the occurrence frequency of the subsequent term extracted by the preceding-and-subsequent term extraction unit 21, both of which are received from the frequency calculation unit 22, the probability-of-concurrence calculation unit 24 calculates the probabilities of the preceding and subsequent terms cooccurring with the specified term. From information regarding the occurrence probability of the specified term, from that of the preceding term, and from that of the subsequent term, all of which are received from the probability-of-occurrence calculation unit 23, as well as from information regarding the probability of the preceding term cooccurring with the specified term and information regarding the probability of the subsequent term cooccurring with the specified term, both of which are received from the probability-of-concurrence calculation unit 24, the order-dependent degree-of-association unit 25 calculates order-dependent degrees of the preceding and subsequent terms occurring with the specified term.

From information regarding the degree of association received from the order-dependent degree-of-association calculation unit 25, the order-independent degree-of-association calculation unit 26 calculates order-independent degrees of the preceding and subsequent terms occurring with -the specified term.

On the basis of the degree-of-association information calculated by the order-independent degree-of-association calculation unit 26, the term group extraction unit 27 extracts from the text data a group of terms related to the specified term. The storage unit (not shown) stores at least one of computational results or extraction results related to a specified term. The term segmentation unit (not shown) separates text data on a per-term or per-morpheme basis.

The foregoing units, the CPU 11, the main memory 12, the hard disk 13, and other elements will now be explained in association with one another.

The CPU 11, which serves as the related term group extraction unit 30, extracts a group of terms related to all of the at least two terms through use of groups of terms extracted by the term group extraction unit 27 as being related to the two respective terms.

Here, the following explanation is based on the assumption that the CPU 11, which serves as the related term group extraction unit 30, extracts a group of terms related to terms "エジプト (EJIPUTO; Egypt)" and "大統領 (DAITORYO; president)."

As mentioned for Unit (b), the CPU 11 is formed so as to serve as the frequency calculation unit 22, the preceding-and-subsequent term extraction unit 21, the probability-of-concurrence calculation unit 24, the probability-of-occurrence calculation unit 23, the order-dependent degree-of-association calculation unit 25, the order-independent degree-of-association calculation unit 26, the term group extraction unit 27, and the term segmentation unit. The memory 12 and the hard disk 13 are formed so as to serve as a storage unit.

FIGS. 22 and 23 show lists of related terms extracted from text data by the term group extraction unit 27 on the basis of the order-independent degree of association r(ωi, ωk). FIG. 22 shows a list of terms related to the term "エジプト (EJIPUTO; Egypt)," and FIG. 23 shows a list of terms related to the term "大統領 (DAITORYO; president)."

The CPU 11, which serves as the related term group extraction unit 30, extracts a group of terms related to the two terms "エジプト (EJIPUTO; Egypt)" and "大統領 (DAITORYO; president)" through use of the lists of terms related to the respective terms "エジプト (EJIPUTO; Egypt)" and "大統領 (DAITORYO; president)" such as those shown in FIGS. 22 and 23.

More specifically, the CPU 11, which serves as the related term group extraction unit 30, extracts a group of terms related to the two terms "エジプト (EJIPUTO; Egypt)" and "大統領 (DAITORYO; president)" by extraction of a common term or morpheme from the lists of terms related to the respective terms "エジプト (EJIPUTO; Egypt)" and "大統領 (DAITORYO; president)" such as those shown in FIGS. 22 and 23.

Figure 24:
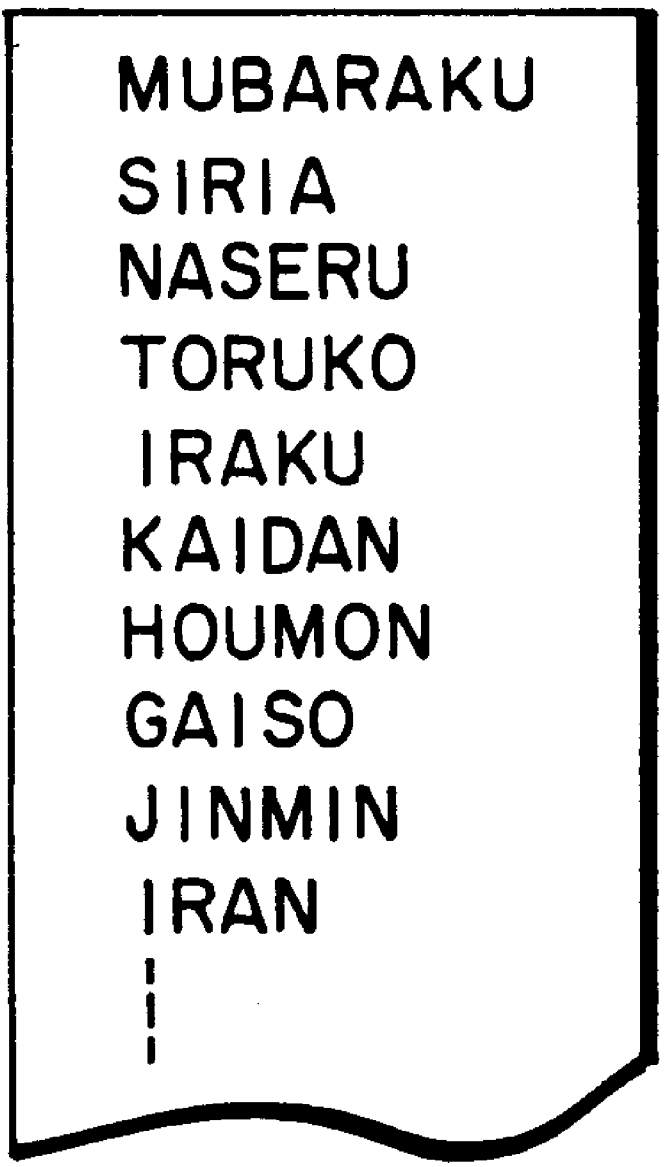
FIG. 24 shows a list of terms extracted by a related term group extraction unit according to the second modification of the embodiment of the present invention as being related to two terms "エジプト (EJIPUTO; Egypt)" and "大統領 (DAITORYO; president)"

FIG. 24 shows a list of terms related to the two terms "エジプト (EJIPUTO; Egypt)" and "大統領 (DAITORYO; president)." A term shared between the list of terms related to the term "エジプト (EJIPUTO; Egypt)" shown in FIG. 22 and the list of terms related to the term "大統領 (DAITORYO; president)" shown in FIG. 23, e.g., a related term "ムバラク (MUBARAKU; Mubarak)," is extracted, and a list of terms related to the thus-extracted term is prepared.

With the foregoing configuration, the general-purpose computer 1y according to the embodiment of the present invention becomes operative as a result of the related term extraction program being installed from a computer-readable recording medium such as a CD-ROM, to the main unit 1a of the computer 1y.

The related term extraction program is intended to cause the general-purpose computer 1y to extract a group of terms related to the keyword from text data and comprises a sequence of numbered commands suitable for the computer 1y to execute the keyword specification function, the frequency calculation function, the preceding-and-subsequent term extraction function, the probability-of-concurrence calculation function, the probability-of-occurrence calculation function, the order-dependent degree-of-association-of-terms calculation function, the order-independent degree-of-association calculation function, the term group extraction function, the term segmentation function, and a related term group extraction function.

The related term group extraction function causes the computer 1y to extract a group of terms related to the two terms "エジプト (EJIPUTO; Egypt)" and "大統領 (DAITORYO; president)" through use of groups of terms extracted by the term group extraction unit 27 as being related to the two respective terms "エジプト (EJIPUTO; Egypt)" and "大統領 (DAITORYO; president)".

The keyword specification function causes the computer 1y to specify a keyword for which related terms are extracted from text data. The term segmentation function causes the computer 1y to segment document information included in the text data on a per-term or per-morpheme basis. The preceding-and-subsequent term extraction function causes the computer 1y to extract the term ωfi occurring prior to the keyword ωk or the term ωbi occurring subsequent to the same in the text data. The frequency calculation function causes the computer 1y to calculate the occurrence frequencies f(ωi) and f(ωk).

The probability-of-occurrence calculation function causes the computer 1y to calculate the occurrence probability of the keyword ωk, i.e., P(ωk), and the occurrence probabilities of the preceding term ωfi and the subsequent term ωbi extracted by means of the preceding-and-subsequent term extraction function, i.e., P(ωfi) and P(ωbi). The probability-of-concurrence calculation function causes the computer 1y to calculate the occurrence probability of the preceding term ωfi, extracted by means of the preceding-and-subsequent term extraction function, cooccurring with the specified term, i.e., P(ωfi, ωk), and the occurrence probability of the subsequent term ωbi, extracted by means of the preceding-and-subsequent term extraction function, cooccurring with the specified term, i.e., P(ωk, ωbi). The order-dependent degree-of-association-of-terms calculation causes the computer 1y to calculate an order-dependent degree of association of the preceding term ωfi with the keyword ωk, i.e., A(ωfi, ωk), and an order-dependent degree of association of the preceding term ωbi with the keywordωk, i.e., A(ωk, ωbi), on the basis of the probability-of-concurrence P(ωi, ωk) and on the basis of the probability-of-concurrence P(ωk, 107 i) calculated by means of the probability-of-occurrence calculation function and of the probability-of-occurrence information items P(ωk), P(ωfi), and P(ωbi) calculated by means of the probability-of-occurrence calculation function.

The order-independent degree-of-association calculation function causes the computer 1y to calculate the order-independent degrees of the preceding and subsequent terms occurring with a keyword, i.e., r(ωi, ωk), on the basis of the degree-of-association information items A(ωfi, ωk) and A(ωk, ωbi) calculated by means of the order-dependent degree-of-association calculation function.

The term group extraction function causes the computer 1y to extract from the text data and outputting a group of terms related to the keyword ωk, on the basis of the degree-of-association information r(ωi, ωk) calculated by means of the order-independent degree-of-association calculation function.

In association with the operations of the CPU 11 and the foregoing functions, specific operation procedures will be described. The CPU 11, which performs the related term group extraction function, extracts a group of terms related to the two terms "エジプト (EJIPUTO; Egypt)" and "大統領 (DAITORYO; president)" through use of lists of terms related to the respective terms "エジプト (EJIPUTO; Egypt)" and "大統領 (DAITORYO; president)" such as those shown in FIGS. 22 and 23.

More specifically, the CPU 11, which serves as the related term group extraction unit 30, extracts a group of terms related to the two terms "エジプト (EJIPUTO; Egypt)" and "大統領 (DAITORYO; president)," e.g., a related term "ムバラク (MUBARAKU; Mubarak)," by extraction of a common term or morpheme from the lists of terms related to the respective terms "エジプト (EJIPUTO; Egypt)" and "大統領 (DAITORYO; president)" such as those shown in FIGS. 22 and 23, thus preparing a list of a group of terms related to the two terms "エジプト (EJIPUTO; Egypt)" and "大統領 (DAITORYO; president)" such as that shown in FIG. 24.

In a related term group extraction step, the CPU 11 extracts a group of terms related to the two terms "エジプト (EJIPUTO; Egypt)" and "大統領 (DAITORYO; president)" from the groups of terms related to the respective terms "エジプト (EJIPUTO; Egypt)" and "大統領 (DAITORYO; president)," which have been extracted in the term group extraction step.

The CPU 11 performs operations such as those shown in FIGS. 12 through 15 as the keyword specification function, the frequency calculation function, the preceding-and-subsequent term extraction function, the probability-of-concurrence calculation function, the probability-of-occurrence calculation function, the order-dependent degree-of-association calculation function, the order-independent degree-of-association calculation function, the term group extraction function, and the term segmentation function.

In other words, the general-purpose computer 1y extracts related terms from text data through execution of the keyword specification step, the preceding-and-subsequent term extraction step, the probability-of-concurrence calculation step, the probability-of-occurrence calculation step, the order-dependent degree-of-association calculation step, the order-independent degree-of-association calculation step, the term group extraction step, the term segmentation step, and the related term group extraction step.

As mentioned previously, in the general-purpose computer 1y to which is installed the related term extraction apparatus according to the second modification of the embodiment of the present invention, in addition to the extraction of related terms previously mentioned for unit (b), the CPU 11 can prepare the lists of groups of terms related to the respective terms "エジプト (EJIPUTO; Egypt)" and "大統領 (DAITORYO; president)" (see FIGS. 22 and 23), on the basis of a square root of a sum of the square of the order-dependent degree of association of the preceding term with the keyword A(ωi, ωk) and the square of the order-dependent degree of association of the subsequent term with the keyword A(ωk, ωi). In addition, it is possible to obtain information about the president of Egypt, as well as to find terms related to both the two terms "エジプト (EJIPUTO; Egypt)" and "大統領 (DAITORYO; president)," without viewing specific contents of a document. Further, it becomes easier to acquire a relationship between the two terms "エジプト (EJIPUTO; Egypt)" and "大統領 (DAITORYO; president)" and their accompanying information.

(b3) Description of a Third Modification of the Embodiment

Figure 25:
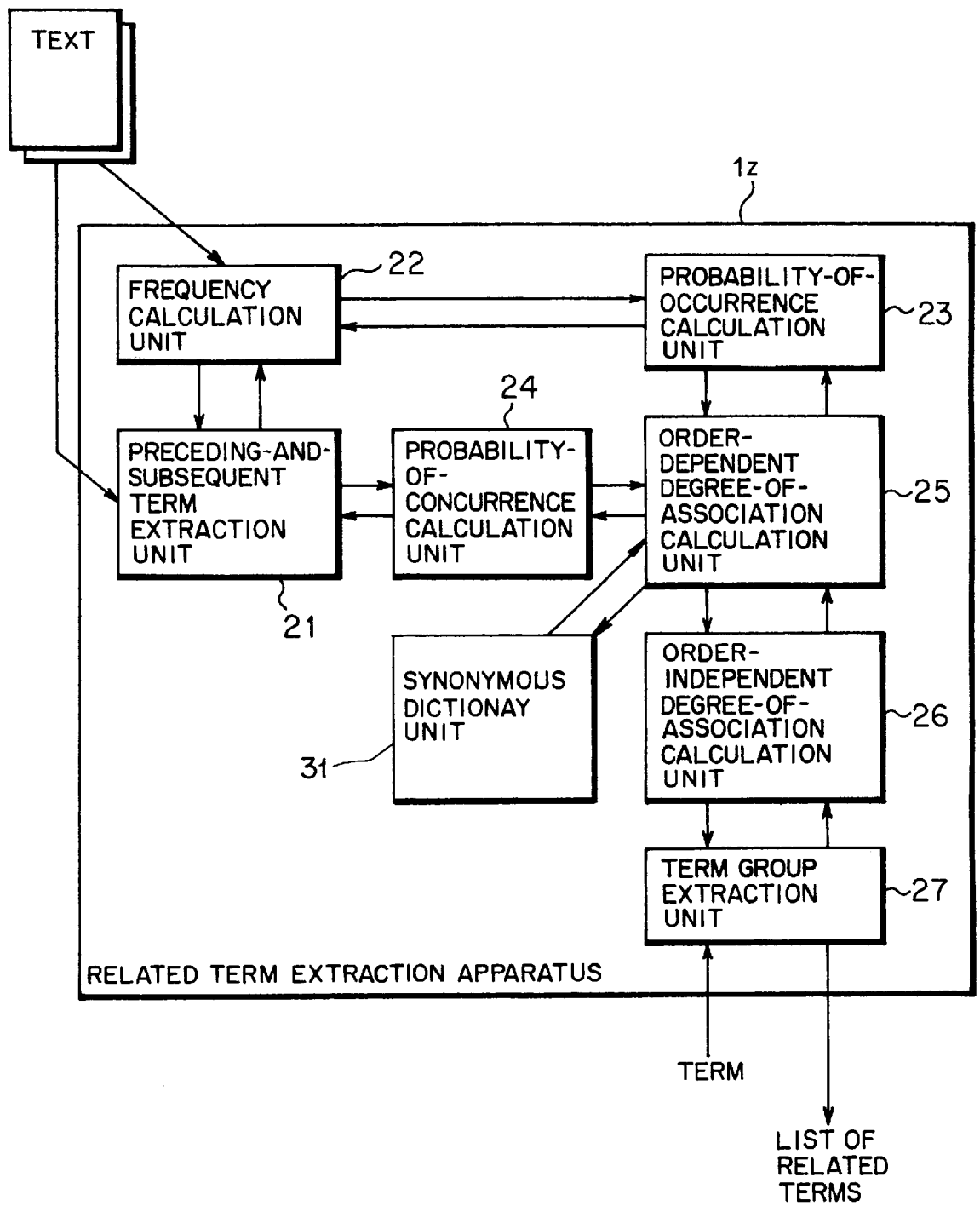
FIG. 25 is a block diagram showing a general-purpose computer to which is installed a related term extraction apparatus according to a third modification of the embodiment of the present invention.

FIG. 25 is a block diagram showing a general-purpose computer 1z to which is installed a related term extraction apparatus according to a third modification of the embodiment of the present invention. As shown in FIG. 25, the computer 1z according to the third modification of the embodiment of the present invention comprises the frequency calculation unit 22, the preceding-and-subsequent term extraction unit 21, the probability-of-concurrence calculation unit 24, the probability-of-occurrence calculation unit 23, the order-dependent degree-of-association calculation unit 25, the order-independent degree-of-association calculation unit 26, the term group extraction unit 27, a term segmentation unit (not shown), a storage unit (not shown), and a synonym dictionary unit 31.

The computer 1z has the same hardware configuration as that of the computer 1 shown in FIGS. 1 and 2 mentioned previously.

Since elements are assigned the same reference numerals as those used in the embodiment explanation unit (b) and operate in the same manner, their explanations will be omitted here.

The synonym dictionary unit (a synonym dictionary means) 31 determines a term ωks (a synonymous term may be hereinafter assigned the symbol ωks) which is defined synonymous with the keyword ωk.

Although the following explanations will be given of a case where one other term is defined synonymous with the keyword, the same applies to the case of determining two or more terms to be synonymous with the keyword. The following explanations will also be given of a case where the term group extraction unit 27 prepares a list of terms related to the keyword ωk and a list of terms related to a term ωks anonymous with the keyword ωk by the order-dependent degree-of-association calculation unit 25 calculating the degrees of a term occurring with the keyword ωk, i.e., A(ωi, ωk) and A(ωk, ωi), and the degrees of a synonymous term occurring with the keyword ωk, i.e., A(ωks, ωi) and A(ωi, ωks).

The preceding-and-subsequent term extraction unit 21 extracts a preceding term occurring prior to a specified term or a subsequent term occurring subsequent to the same in text data. From information regarding the occurrence frequency of the specified term and from information regarding the occurrence frequencies of the preceding and subsequent terms in the text data, both of which are received from the frequency calculation unit 22, the probability-of-occurrence calculation unit 23 is capable of calculating the occurrence probability of the preceding term and the occurrence probability of the subsequent term together with the occurrence probability of the specified term.

From the information regarding the occurrence frequency of the preceding term extracted by the preceding-and-subsequent term extraction unit 21 and from the information regarding the occurrence frequency of the subsequent term extracted by the preceding-and-subsequent term extraction unit 21, both of which are received from the frequency calculation unit 22, the probability-of-concurrence calculation unit 24 calculates the probabilities of the preceding and subsequent terms cooccurring with the specified term. From information regarding the occurrence probability of the specified term, from that of the preceding term, and from that of the subsequent term, all of which are received from the probability-of-occurrence calculation unit 23, as well as from information regarding the probability of the preceding term cooccurring with the specified term and information regarding the probability of the subsequent term cooccurring with the specified term, both of which are received from the probability-of-concurrence calculation unit 24, the order-dependent degree-of-association unit 25 calculates order-dependent degrees of the preceding and subsequent terms occurring with the specified term.

From information regarding the degree of association received from the order-dependent degree-of-association calculation unit 25, the order-independent degree-of-association calculation unit 26 calculates order-independent degrees of the preceding and subsequent terms occurring with the specified term.

On the basis of the degree-of-association information calculated by the order-independent degree-of-association calculation unit 26, the term group extraction unit (not shown) extracts from the text data a group of terms related to the specified term. The storage unit (not shown) stores at least one of computational results or extraction results related to a specified term. The term segmentation unit (not shown) separates text data on a per-term or per-morpheme basis.

The foregoing individual units can process a term synonymous with a specified term (or the keyword ωk) in the same manner as they process the specified term (or the keyword ωk). For example, the order-dependent degree-of-association calculation unit 25 calculates the degrees of a synonymous term occurring with the keyword ωk, i.e., A(ωks, ωi) and A(ωi, ωks). The frequency calculation unit 22 calculates the occurrence frequency of the synonymous term ωks, i.e., f(ωks). The preceding-and-subsequent term extraction unit 21 extracts from text data a term occurring prior to the synonymous term ωks and a term occurring subsequent to the same. The term group extraction unit 27 extracts from the text data terms related to the synonymous term ωks, on the basis of the degree-of-association information r(ωi, ωks) calculated by the order-independent degree-of-association calculation unit 26.

The foregoing units, the CPU 11, the main memory 12, the hard disk 13, and other elements will now be explained in association with one another.

The CPU 11, which serves as the synonym dictionary unit 31, determines a term ωks to be synonymous with the keyword ωk. At the time of determining the term ωks to be synonymous with the keyword ωk, the CPU 11 detects a term by reference to synonym dictionary data stored in a storage device, such as the hard disk 13, or a recording medium, such as an FD.

Here, the following explanation is based on the assumption that the CPU 11, which serves as the synonym dictionary unit 31, defines a term "朝鮮民主主義人民共和国 (CHOSEN-MINSYUSHUGI-JINMIN-KYOWA-KOKU; the Democratic People's Republic of Korea)" to be synonymous with a keyword "北朝鮮 (KITACHOSEN; North Korea)."

As mentioned for Unit (b), the CPU 11 is formed so as to serve as the frequency calculation unit 22, the preceding-and-subsequent term extraction unit 21, the probability-of-concurrence calculation unit 24, the probability-of-occurrence calculation unit 23, the order-dependent degree-of-association calculation unit 25, the order-independent degree-of-association calculation unit 26, the term group extraction unit 27, and the term segmentation unit. The memory 12 and the hard disk 13 are formed so as to serve as a storage unit.

FIGS. 26 and 27 show lists of related terms extracted from text data by the term group extraction unit 27 on the basis of the order-independent degree of association r(ωi, ωk). FIG. 26 shows a list of terms related to the term "北朝鮮 (KITACHOSEN; North Korea)," and FIG. 27 shows a list of terms related to the term "朝鮮民主主義人民共和国 (CHOSEN-MINSYUSHUGI-JINMIN-KYOWA-KOKU; the Democratic People's Republic of Korea)."

From the list of terms related to the keyword "北朝鮮 (KITACHOSEN; North Korea)" shown in FIG. 26 and the list of terms related to the synonymous term "朝鮮民主主義人民共和国 (CHOSEN-MINSYUSHUGI-JINMIN-KYOWA-KOKU; the Democratic People's Republic of Korea)," the CPU 11, which serves as the term group extraction unit 27, extracts terms having high degrees of relations as calculated by the order-independent degree-of-association calculation unit 26, thus outputting a list of terms related to the keyword "北朝鮮 (KITACHOSEN; North Korea)" such as that shown in FIG. 28.

More specifically, in a case where a term is not in the list of terms related to the keyword "北朝鮮 (KITACHOSEN; North Korea)" but is included in the list of terms related to the synonymous term "朝鮮民主主義人民共和国 (CHOSEN-MINSYUSHUGI-JINMIN-KYOWA-KOKU; the Democratic People's Republic of Korea)," the CPU 11, which serves as the term group extraction unit 27, outputs the related terms included in the related-term list of the synonymous term as terms related to the keyword "北朝鮮 (KITACHOSEN; North Korea)," through use of the related-term list information items shown in FIGS. 26 and 27. For example, since a term "国旗 (KOKKI; the national flag)" does not assume a high rank in the list of related terms shown in FIG. 26 but assumes a high rank in the list of related terms shown in FIG. 27, the CPU 11, which serves as the term group extraction unit 27, outputs the term "国旗 (KOKKI; the national flag)" as a term related to the keyword "北朝鮮 (KITACHOSEN; North Korea)."

With the foregoing configuration, the general-purpose computer 1z to which is installed the related term extraction apparatus according to the third modification of the embodiment of the present invention becomes operative as a result of the related term extraction program being installed from a computer-readable recording medium such as a CD-ROM, to the main unit 1a of the computer 1z.

The related term extraction program is intended to cause the general-purpose computer 1z to extract a group of terms related to the keyword from text data and comprises a sequence of numbered commands suitable for the computer 1z to execute the keyword specification function, the frequency calculation function, the preceding-and-subsequent term extraction function, the probability-of-concurrence calculation function, the probability-of-occurrence calculation function, the order-dependent degree-of-association-of-terms calculation function, the order-independent degree-of-association calculation function, the term group extraction function, the term segmentation function, the related term group extraction function, and a synonym dictionary function.

The synonym dictionary function causes the computer 1z to determine a term to be synonymous with the keyword "北朝鮮 (KITACHOSEN; North Korea)."

The keyword specification function causes the computer 1z to specify a keyword for which related terms are extracted from text data. The term segmentation function causes the computer 1z to segment document information included in the text data on a per-term or per-morpheme basis. The preceding-and-subsequent term extraction function causes the computer 1z to extract the term ωfi occurring prior to the keyword ωk or the term ωbi occurring subsequent to the same in the text data. The frequency calculation function causes the computer 1z to calculate the occurrence frequencies f(ωi) and f(ωk).

The probability-of-occurrence calculation function causes the computer 1z to calculate the occurrence probability of the keyword ωk, i.e., P(ωk), and the occurrence probabilities of the preceding term ωfi and the subsequent term ωbi extracted by means of the preceding-and-subsequent term extraction function, i.e., P(ωfi) and P(ωbi). The probability-of-concurrence calculation function causes the computer 1z to calculate the occurrence probability of the preceding term ωfi, extracted by means of the preceding-and-subsequent term extraction function, cooccurring with the specified term, i.e., P(ωfi, ωk), and the occurrence probability of the subsequent term ωbi, extracted by means of the preceding-and-subsequent term extraction function, cooccurring with the specified term, i.e., P(ωk, ωbi). The order-dependent degree-of-association-of-terms calculation causes the computer 1z to calculate an order-dependent degree of association of the preceding term ωfi with the keyword ωk, i.e., A(ωfi, ωk), and an order-dependent degree of association of the preceding term ωbi with the keyword ωk, i.e., A(ωk, ωbi), on the basis of the probability-of-concurrence P(ωi, ωk) and on the basis of the probability-of-concurrence P(ωk, ωi) calculated by means of the probability-of-occurrence calculation function and of the probability-of-occurrence information items P(ωk), P(ωfi), and P(ωbi) calculated by means of the probability-of-occurrence calculation function.

The order-independent degree-of-association calculation function causes the computer 1z to calculate the order-independent degrees of the preceding and subsequent terms occurring with a keyword, i.e., r(ωi, ωk), on the basis of the degree-of-association information items A(ωfi, ωk) and A(ωk, ωbi) calculated by means of the order-dependent degree-of-association calculation function.

The term group extraction function causes the computer 1z to extract from the text data and outputting a group of terms related to the keyword ωk, on the basis of the degree-of-association information r(ωi, ωk) calculated by means of the order-independent degree-of-association calculation function.

In association with the operations of the CPU 11 and the foregoing functions, specific operation procedures will be described. The CPU 11, which performs the synonym dictionary function, extracts terms having high degrees of relations as calculated by the order-independent degree-of-association calculation unit 26 from the list of terms related to the keyword "北朝鮮 (KITACHOSEN; North Korea)" shown in FIGS. 26 and 27 and the list of terms related to the synonymous term "朝鮮民主主義人民共和国 (CHOSEN-MINSYUSHUGI-JINMIN-KYOWA-KOKU; the Democratic People's Republic of Korea)," thus outputting a list of terms related to the keyword "北朝鮮 (KITACHOSEN; North Korea)" such as that shown in FIG. 28.

More specifically, in a case where a term is not in the list of terms related to the keyword "北朝鮮 (KITACHOSEN; North Korea)" but is included in the list of terms related to the synonymous term "朝鮮民主主義人民共和国 (CHOSEN-MINSYUSHUGI-JINMIN-KYOWA-KOKU; the Democratic People's Republic of Korea)," the CPU 11, which performs the term group extraction function, outputs the related terms included in the related-term list of the synonymous term as terms related to the keyword "北朝鮮 (KITACHOSEN; North Korea)," through use of the related-term list information items shown in FIGS. 26 and 27.

For example, since a term "国旗 (KOKKI; the national flag)" does not assume a high rank in the list of related terms shown in FIG. 26 but assumes a high rank in the list of related terms shown in FIG. 27, the CPU 11, which performs the term group extraction function, outputs the term "国旗 (KOKKI; the national flag)" as a term related to the keyword "北朝鮮 (KITACHOSEN; North Korea)," as shown in FIG. 28.

In other words, in the keyword specification step, the CPU 11 defines the term "朝鮮民主主義人民共和国 (CHOSEN-MINSYUSHUGI-JINMIN-KYOWA-KOKU; the Democratic People's Republic of Korea)" to be synonymous with the keyword "北朝鮮 (KITACHOSEN; North Korea)." In the term group extraction step, the CPU outputs the group of terms related to the synonymous term "朝鮮民主主義人民共和国 (CHOSEN-MINSYUSHUGI-JINMIN-KYOWA-KOKU; the Democratic People's Republic of Korea)" and the group of terms related to the keyword "北朝鮮 (KITACHOSEN; North Korea)" in the form of one group of terms.

For both the group of terms related to the keyword "北朝鮮 (KITACHOSEN; North Korea)" and the group of terms related to the synonymous term "朝鮮民主主義人民共和国 (CHOSEN-MINSYUSHUGI-JINMIN-KYOWA-KOKU; the Democratic People's Republic of Korea)," the CPU 11 performs operations such as those shown in FIGS. 12 through 15 as the keyword specification function, the frequency calculation function, the preceding-and-subsequent term extraction function, the probability-of-concurrence calculation function, the probability-of-occurrence calculation function, the order-dependent degree-of-association calculation function, the order-independent degree-of-association calculation function, the term group extraction function, and the term segmentation function.

In other words, the general-purpose computer 1z extracts related terms from text data through execution of the keyword specification step, the preceding-and-subsequent term extraction step, the probability-of-concurrence calculation step, the probability-of-occurrence calculation step, the order-dependent degree-of-association calculation step, the order-independent degree-of-association calculation step, the term group extraction step, the term segmentation step, and outputting of a group of terms related to a synonymous term and a group of terms related to the keyword in one group of terms.

As mentioned previously, in the general-purpose computer 1z to which is installed the related term extraction apparatus according to the third modification of the embodiment of the present invention, in addition to the extraction of related terms previously mentioned for unit (b), the CPU 11 can prepare a list of terms related to the term "北朝鮮 (KITACHOSEN; North Korea)" and a list of terms related to the term "朝鮮民主主義人民共和国 (CHOSEN-MINSYUSHUGI-JINMIN-KYOWA-KOKU; the Democratic People's Republic of Korea)" (see FIGS. 26 and 27) and can prepare a list of terms into which groups of terms related to the keyword "北朝鮮 (KITACHOSEN; North Korea)" are grouped, on the basis of a square root of a sum of the square of the order-dependent degree of association of the preceding term with the keyword A($\omega$i, $\omega$k) and the square of the order-dependent degree of association of the subsequent term with the keyword A($\omega$k, $\omega$i). Synonymous terms which can be written in representations and impose a problem in automatic extraction of related terms can also be handled.

(c) Others (c1) Description of Another Embodiment

Figure 29:
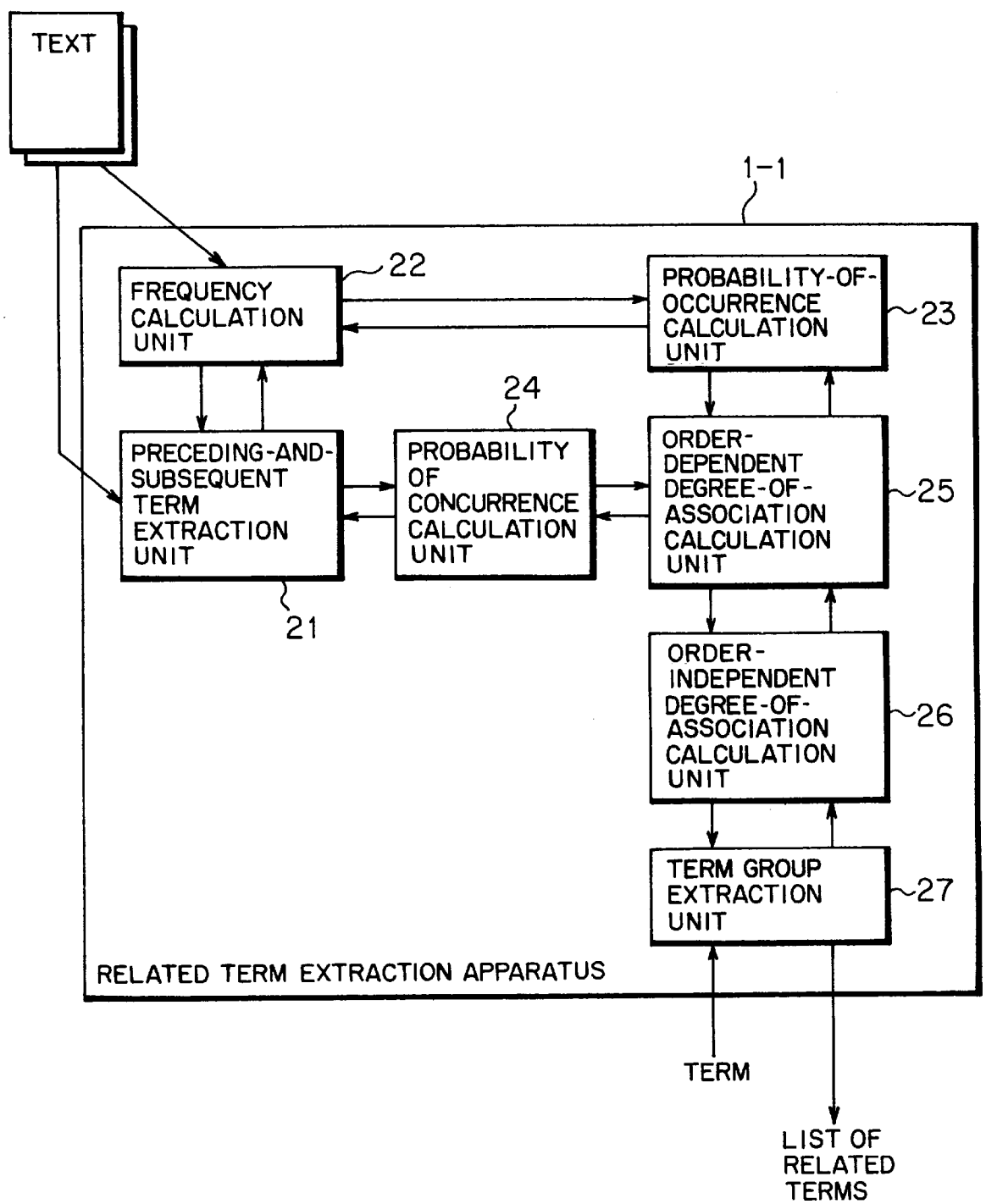
FIG. 29 is a block diagram showing a general-purpose computer to which is installed a related term extraction apparatus according to another embodiment of the present invention.

FIG. 29 is a block diagram showing a general-purpose computer 1-1 to which is installed a related term extraction apparatus according to another embodiment of the present invention. As shown in FIG. 29, the computer 1-1 comprises the preceding-and-subsequent term extraction unit 21, the frequency calculation unit 22, the probability-of-concurrence calculation unit 24, the probability-of-occurrence calculation unit 23, the order-dependent degree-of-association calculation unit 25, the order-independent degree-of-association calculation unit 26, the term extraction unit 27, and a storage unit (not shown).

The computer 1-1 has the same hardware configuration as that of the computer 1 shown in FIGS. 1 and 2 mentioned previously.

Here, the computer 1-1—to which is installed a related term extraction apparatus according to another embodiment of the present invention—differs from the general-purpose computer 1 according to the embodiment mentioned for unit (b) in that the computer 1-1 is not provided with a term segmentation unit.

The preceding-and-subsequent term extraction unit 21 extracts a preceding term occurring prior to a specified term or a subsequent term occurring subsequent to the same in text data. From information regarding the occurrence frequency of the specified term and from information regarding the occurrence frequencies of the preceding and subsequent terms in the text data, both of which are received from the frequency calculation unit 22, the probability-of-occurrence calculation unit 23 is capable of calculating the occurrence probability of the preceding term and the occurrence probability of the subsequent term together with the occurrence probability of the specified term.

From the information regarding the occurrence frequency of the preceding term extracted by the preceding-and-subsequent term extraction unit 21 and from the information regarding the occurrence frequency of the subsequent term extracted by the preceding-and-subsequent term extraction unit 21, both of which are received from the frequency calculation unit 22, the probability-of-concurrence calculation unit 24 calculates the probabilities of the preceding and subsequent terms cooccurring with the specified term. From information regarding the occurrence probability of the specified term, from that of the preceding term, and from that of the subsequent term, all of which are received from the probability-of-occurrence calculation unit 23, as well as from information regarding the probability of the preceding term cooccurring with the specified term and information regarding the probability of the subsequent term cooccurring with the specified term, both of which are received from the probability-of-concurrence calculation unit 24, the order-dependent degree-of-association unit 25 calculates order-dependent degrees of the preceding and subsequent terms occurring with the specified term.

From information regarding the degree of association received from the order-dependent degree-of-association calculation unit 25, the order-independent degree-of-association calculation unit 26 calculates order-independent degrees of the preceding and subsequent terms occurring with the specified term.

On the basis of the degree-of-association information calculated by the order-independent degree-of-association calculation unit 26, the term group extraction unit 27 extracts from the text data a group of terms related to the specified term. The storage unit (not shown) stores at least one of computational results or extraction results related to a specified term.

The foregoing individual units, the CPU 11, the main memory 12, the hard disk 13, and other elements will now be explained in association with one another. The CPU 11 comprises the frequency calculation unit 22, the preceding-and-subsequent term extraction unit 21, the probability-of-concurrence calculation unit 24, the probability-of-occurrence calculation unit 23, the order-dependent degree-of-association calculation unit 25, the order-independent degree-of-association calculation unit 26, and the term group extraction unit 27. The memory 12 and the hard disk 13 are constituted as storage units.

With the foregoing configuration, the general-purpose computer 1-1 to which is installed the related term extraction apparatus according to another embodiment of the present invention becomes operative as a result of the related term extraction program being installed from a computer-readable recording medium such as a CD-ROM, to the main unit 1a of the computer.

The related term extraction program is intended to cause the general-purpose computer 1-1 to extract a group of terms related to the keyword from text data and comprises a sequence of numbered commands suitable for the computer 1-1 to execute the keyword specification function, the frequency calculation function, the preceding-and-subsequent term extraction function, the probability-of-concurrence calculation function, the probability-of-occurrence calculation function, the order-dependent degree-of-association-of-terms calculation function, the order-independent degree-of-association calculation function, the term group extraction function, and the degree-of-similarity calculation function.

The keyword specification function causes the computer 1-1 to specify a keyword for which related terms are extracted from text data. The preceding-and-subsequent term extraction function causes the computer 1-1 to extract the term $\omega$fi occurring prior to the keyword $\omega$k or the term ωbi occurring subsequent to the same in the text data. The frequency calculation function causes the computer 1-1 to calculate the occurrence frequencies f(ωi) and f(ωk).

The probability-of-occurrence calculation function causes the computer 1-1 to calculate the occurrence probability of the keyword ωk, i.e., P(ωk), and the occurrence probabilities of the preceding term ωfi and the subsequent term ωbi extracted by means of the preceding-and-subsequent term extraction function, i.e., P(ωfi) and P(ωbi). The probability-of-concurrence calculation function causes the computer 1-1 to calculate the occurrence probability of the preceding term ωfi, extracted by means of the preceding-and-subsequent term extraction function, cooccurring with the specified term, i.e., P(ωfi, ωk), and the occurrence probability of the subsequent term ωbi, extracted by means of the preceding-and-subsequent term extraction function, cooccurring with the specified term, i.e., P(ωk, ωbi). The order-dependent degree-of-association-of-terms calculation causes the computer 1-1 to calculate an order-dependent degree of association of the preceding term ωfi with the keyword ωk, i.e., A(ωfi, ωk), and an order-dependent degree of association of the preceding term ωbi with the keyword ωk, i.e., A(ω, ωbi), on the basis of the probability-of-concurrence P(ωi, ωk) and on the basis of the probability-of-concurrence P(ωk, ωi) calculated by means of the probability-of-occurrence calculation function and of the probability-of-occurrence information items P(ωk), P(ωfi), and P(ωbi) calculated by means of the probability-of-occurrence calculation function.

The order-independent degree-of-association calculation function causes the computer 1-1 to calculate the order-independent degrees of the preceding and subsequent terms occurring with a keyword, i.e., r(ωi, ωk), on the basis of the degree-of-association information items A(ωfi, ωk) and A(ωk, ωbi) calculated by means of the order-dependent degree-of-association calculation function.

The term group extraction function causes the computer 1z to extract from the text data and outputting a group of terms related to the keyword ωk, on the basis of the degree-of-association information r(ωi, ωk) calculated by means of the order-independent degree-of-association calculation function.

The CPU 11 performs operations such as those shown in FIGS. 12 through 14 and in FIG. 30 as the keyword specification function, the frequency calculation function, the preceding-and-subsequent term extraction function, the probability-of-concurrence calculation function, the probability-of-occurrence calculation function, the order-dependent degree-of-association calculation function, the order-independent degree-of-association calculation function, and the term group extraction function.

FIG. 30 is a flowchart showing the flow of processing operations required when the CPU 11, which serves as the frequency calculation unit 22, executes the related term extraction program. As shown in FIG. 30, the CPU 11, which performs the frequency calculation function, determines whether or not a received signal is an instruction from the probability-of-occurrence calculation unit 23 (step S40). In a case where the signal is an instruction from the probability-of-occurrence calculation unit 23, the CPU makes a decision as to whether or not the occurrence frequency f(ωk) regarding the keyword ωk is stored in the storage device (step S41).

In a case where the occurrence frequency information f(ωk) is not stored in the storage device, the CPU 11, which performs the frequency calculation function, calculates the occurrence frequencies (or number of times) of the keyword ωk in the text data (step S42) and outputs the result of such calculation (step S43).

Although not shown in FIG. 30, the CPU 11, which performs the frequency calculation function, also calculates the number of occurrence frequencies of the preceding and subsequent terms ωfi and ωbi extracted by the CPU 11, which serves as the preceding-and-subsequent extraction function.

Here, the CPU 11, which performs the frequency calculation function, calculates the probability-of-occurrence information items P(ωk) and P(ωfi) from the occurrence frequency information items f(ωk) and f(ωi).

In contrast, if the received signal is not an instruction from the probability-of-occurrence calculation unit 23, the CPU 11, which serves as the frequency calculation unit 22, determines whether or not the signal is an instruction from the preceding-and-subsequent term extraction unit 21 (step S44).

In a case where the signal is an instruction from the preceding-and-subsequent term extraction unit 21, the CPU 11, which serves as the frequency calculation unit 22, counts the occurrence frequencies of terms included in the text data received from the preceding-and-subsequent term extraction unit 21 (step S45). The total number of occurrence frequencies of the terms is output to the probability-of-occurrence calculation unit 23 (step S46).

If the CPU 11, which serves as the frequency calculation unit 22, determines that the received signal is not an instruction from the preceding-and-subsequent term extraction unit 21, the signal is handled as an error.

The flow (not shown) of processing of the CPU 11 which serves as the probability-of-occurrence calculation unit 23 is as follows. More specifically, as a result of execution of the related term extraction program, the CPU determines whether or not the information regarding the occurrence probability P(ωi) to be sought is stored in the storage device. If the information is not stored in the storage device, the CPU receives from the frequency calculation unit 22 the information items f(ωfi), f(ωbi), and f(ωk) regarding the occurrence frequencies of terms and calculates the occurrence probabilities P(ωbi) and P(ωk). The computational results P(ωbi) and P(ωk) are output. In contrast, if the occurrence probability P(ωi) to be sought, such as P(ωbi) and P(ωk), is stored in the storage device, the CPU 11, which serves as the probability-of-occurrence calculation unit 23, outputs the occurrence probability to the probability-of-concurrence calculation unit 24.

In other words, the general-purpose computer 1 extracts related terms from the text data through execution of the keyword specification step, the preceding-and-subsequent term extraction step, the probability-of-concurrence calculation step, the probability-of-occurrence calculation step, the order-dependent degree-of-association calculation step, the order-independent degree-of-association calculation step, and the term group extraction step.

As mentioned previously, in the general-purpose computer 1-1 which serves as the related term extraction apparatus according to another embodiment of the present invention, the CPU 11 calculates a sum of the square of the order-dependent degree of association of the preceding term with the keyword A(ωi, ωk) and the square of the order-dependent degree of association of the subsequent term with the keyword A(ωk, ωi), and calculates the square root of the sum. Through use of the thus-obtained square root, the computer is capable of extracting in a highly accurate manner terms which are easily understood by the user, with regard to document information which is written in English, German, French, etc., and is segmented into parts of speech.

Further, in the general-purpose computer 1-1 which serves as the related term extraction apparatus according to another embodiment of the present invention, since the general-purpose computer 1-1 is provided with the storage unit, for example, the hard disk 13, information items calculated through the processing executed by the frequency calculation unit 22, the order-dependent degree-of-association calculation unit 25 or the like are stored in the storage unit. Accordingly, the speed of processing associated with extraction of related terms can be increased, and a related-term list can be prepared without dependence on the sequence in which terms appear.

Still further, in the general-purpose computer 1-1 which serves as the related term extraction apparatus according to another embodiment of the present invention, even in a case where the computer 1 performs the keyword specification function, the preceding-and-subsequent term extraction function, the probability-of-concurrence calculation function, the probability-of-occurrence calculation function, the order-dependent degree-of-association calculation function, the order-independent degree-of-association calculation function, the term group extraction function, and the term segmentation function, the CPU 11 calculates a sum of the square of the order-dependent degree of association of the preceding term with the keyword $A(\omega i, \omega k)$ and the square of the order-dependent degree of association of the subsequent term with the keyword $A(\omega k, \omega i)$ and calculates the square root of the sum. Through use of the thus-obtained square root, the computer is capable of extracting in a highly accurate manner related terms which are easily understood by the user, with regard to document information which is written in English, German, French, etc., in the form of segmented terms.

(c2) Description of Another Hardware Configuration

Although the foregoing explanations given of the (b) to (c1) are based on the assumption that the related term extraction apparatus is constituted in the form of a single unit such as the general-purpose computers 1, 1x, 1y, 1z, and 1-1, related terms can also be extracted from a large amount of document data via two or more systems.

For example, a keyword is transmitted to a mainframe host computer from a general-purpose or non-general-purpose computer provided as a user's communications terminal via a communication network (e.g., the Internet Network, a personal computer communications network, or the like). The host computer extracts related terms from a large amount of document data stored such as a database and sends the thus-extracted related terms to the general-purpose or non-general-purpose computer, which has sent the keyword, via the communication network, resulting in operations and effects which are the same as those achieved in units (b) through (c1).

Although the explanation given of unit (b3) has described the case where the order-dependent degree-of-association calculation unit 25 utilizes the synonym dictionary unit 31, groups of related terms can be output in the form of one group in the same manner as in the case of unit (b3) even when the frequency calculation unit 22 or the preceding-and-subsequent term extraction unit 21 refers to the synonym dictionary unit 31. Alternatively, similar operations or effects can be accomplished through use of a thesaurus or a parallel translation dictionary in addition to the synonym dictionary unit 31.

Although the degree-of-similarity calculation unit 29, the related term group extraction unit 30 or the like calculates a degree of similarity or a list of terms related to more than two terms, on the basis of a list of related terms extracted by the term group extraction unit 27, the degree-of-similarity calculation unit 29, the related term group extraction unit 30 or the like may calculate a degree of similarity or a list of terms related to more than two terms, on the basis of the degree-of-association information $r(\omega i, \omega k)$ calculated by the order-independent degree-of-association calculation unit 26. Even in such a case, a degree of similarity among new terms can be determined in the manner analogous to that mentioned previously. Further, it becomes easier to acquire a relationship between two terms and their accompanying information by reference to terms related to the two terms.

In addition to the foregoing embodiments and modifications, various other modifications can also be carried out within the scope of the invention in which related terms are extracted by calculation of an order-independent degree-of-association $r(\omega i, \omega k)$ according to Eq. (5).

(d) Order-dependent Related-term Degree-of-association Calculation Unit

Contrasted with units (b) to (c2), in a case where the term group extraction unit 27 extracts related terms from text data, on the basis of the degree-of-association information $A(\omega i, \omega k)$ or $A(\omega k, \omega i)$ calculated by the order-dependent degree-of-association calculation unit 25, the related term extraction apparatus can prepare a list of terms related to a keyword which is dependent on the sequence in which related terms appear.

Even in such a case, individual units of the frequency calculation unit 22 operate in the same manner as those described for units (b) to (c2).

What is claimed is:

1. A related term extraction apparatus comprising:

preceding-and-subsequent term extraction means for extracting a preceding term occurring prior to a specified term or a subsequent term occurring subsequent to the same in text data;

frequency calculation means for calculating the occurrence frequency of the specified term in the text data, the occurrence frequency of the preceding or subsequent term in the text data, and the occurrence frequencies of the preceding and subsequent terms extracted by the preceding-and-subsequent term extraction means in the text data;

probability-of-occurrence calculation means for calculating the occurrence probabilities of the preceding and subsequent terms together with the occurrence probability of the specified term, from information regarding the occurrence frequency of the specified term in the text data and information regarding the occurrence frequencies of the preceding and subsequent terms in the text data, both of which are received from the frequency calculation means;

probability-of-concurrence calculation means for calculating the probability of the preceding term cooccurring with the specified term and the probability of the subsequent term cooccurring with the specified term, from information regarding the occurrence frequency of the preceding term extracted by the preceding-and-subsequent term extraction means and from information regarding the occurrence frequency of the subsequent term extracted by the preceding-and-subsequent term extraction means, both of which are received from the frequency calculation means;

order-dependent degree-of-association calculation means for calculating an order-dependent degree of association of the preceding term with the specified term and an order-dependent degree of association of the subsequent term with the specified term, from information regarding the occurrence probability of the specified term, from that of the preceding term, and from that of the subsequent term, all of which are received from the probability-of-occurrence calculation means, as well as from information regarding the probability of the preceding term cooccurring with the specified term and information regarding the probability of the subsequent term cooccurring with the specified term, both of which are received from the probability-of-concurrence calculation means;

order-independent degree-of-association calculation means for calculating an order-independent degree of association of the preceding term with the specified term and an order-independent degree of association of the subsequent term with the specified term, from information regarding the degree of association received from the order-dependent degree-of-association calculation means; and term group extraction means for extracting from the text data a group of terms related to the specified term, on the basis of the degree-of-association information calculated by the order-independent degree-of-association calculation means.

2. The related term extraction apparatus as claimed in claim 1, further comprising storage means for storing at least one of computational results or extraction results related to the specified term.

3. The related term extraction apparatus as claimed in claim 1, further comprising term segmentation means for segmenting the text data on a per-term or per-morpheme basis, wherein the preceding-and-subsequent term extraction means and the probability-of-occurrence calculation means perform operations through use of the text data segmented by the term segmentation means.

4. The related term extraction apparatus as claimed in claim 1, further comprising degree-of-similarity calculation means for calculating a degree of similarity between at least two specified terms through use of groups of terms extracted by the term group extraction means as being related to the respective terms.

5. The related term extraction apparatus as claimed in claim 1, further comprising related term group extraction means for extracting a group of terms related to all of the at least two terms through use of groups of terms extracted by the term group extraction means as being related to the two respective terms.

6. The related term extraction apparatus as claimed in claim 1, further comprising synonym dictionary means, wherein a term defined synonymous with the specified term on the basis of information received from the synonym dictionary means is grouped into one group together with the specified term.

7. A method of extracting from text data a group of terms related to a certain term, comprising:

a keyword specification step for specifying a keyword for which related terms are extracted from the text data;

a preceding-and-subsequent term extraction step for extracting a preceding term occurring prior to the specified term in the text data and a subsequent term occurring subsequent to the specified term in the text data;

a probability-of-concurrence calculation step for calculating probabilities of the preceding and subsequent terms, which are extracted in the preceding-and-subsequent term extraction step, cooccurring with the term specified in the keyword specification step;

a probability-of-occurrence calculation step for calculating the occurrence probability of the term, which is specified in the keyword specification step, and the occurrence probabilities of the preceding and subsequent terms extracted in the preceding-and-subsequent term extraction step;

an order-dependent degree-of-association calculation step for calculating an order-dependent degree of association of the preceding term with the specified term and an order-dependent degree of association of the subsequent term with the specified term, from information regarding the occurrence probability of the specified term, from that of the preceding term, and from that of the subsequent term, all of which are calculated in the probability-of-occurrence calculation step, as well as from information regarding the probability of the preceding term cooccurring with the specified term and information regarding the probability of the subsequent term cooccurring with the specified term, both of which are calculated in the probability-of-concurrence calculation step;

an order-independent degree-of-association calculation step for calculating an order-independent degree of association of the preceding term with the specified term and an order-independent degree of association of the subsequent term with the specified term, from information regarding the degree of association calculated in the order-dependent degree-of-association calculation step; and a term group extraction step for extracting from the text data a group of terms related to the specified term, on the basis of the degree-of-association information calculated in the order-independent degree-of-association calculation step.

8. The related term extraction method as claimed in claim 7, further comprising a term segmenting step of segmenting the text data on a per-term or per-morpheme basis before or after the preceding-and-subsequent term extraction step for extracting the preceding and subsequent terms.

9. The related term extraction method as claimed in claim 7, further comprising a degree-of-similarity calculation step for calculating a degree of similarity between at least two specified terms from groups of terms, which have been extracted as being related to the two respective terms in the term group extraction step.

10. The related term extraction method as claimed in claim 7, further comprising related term group extraction step for extracting a group of terms related to all of the at least two terms from groups of terms, which have been extracted as being related to the two respective terms in the term group extraction step.

11. The related term extraction method as claimed in claim 7, wherein in a case where there is a term defined as being synonymous with the term specified in the keyword specification step, a group of terms related to the term defined synonymous and a group of terms related to the specified term are output in one grouped form in the term group extraction step.

12. A computer-readable recording medium having a related term extraction program recorded thereon, the program comprising the following functions to be executed by a computer in order to extract from text data a group of terms related to a certain term:

a keyword specification function of specifying a keyword for which related terms are extracted from the text data;

a preceding-and-subsequent term extraction function of extracting a preceding term occurring prior to the specified term in the text data and a subsequent term occurring subsequent to the specified term in the text data;

a probability-of-concurrence calculation function of calculating probabilities of the preceding and subsequent terms, which are extracted by means of the preceding-and-subsequent term extraction function, cooccurring with the term specified by means of the keyword specification function;

a probability-of-occurrence calculation function of calculating the occurrence probability of the term, which is specified by means of the keyword specification function, and the occurrence probabilities of the preceding and subsequent terms extracted by means of the preceding-and-subsequent term extraction function;

an order-dependent degree-of-association calculation function of calculating an order-dependent degree of association of the preceding term with the specified term and an order-dependent degree of association of the subsequent term with the specified term, from information regarding the occurrence probability of the specified term, from that of the preceding term, and from that of the subsequent term, all of which are calculated by means of the probability-of-occurrence calculation function, as well as from information regarding the probability of the preceding term cooccurring with the specified term and information regarding the probability of the subsequent term cooccurring with the specified term, both of which are calculated by means of the probability-of-concurrence calculation function;

an order-independent degree-of-association calculation function of calculating an order-independent degree of association of the preceding term with the specified term and an order-independent degree of association of the subsequent term with the specified term, from information regarding the degree of association calculated by means of the order-dependent degree-of-association calculation function; and a term group extraction function of extracting from the text data a group of terms related to the specified term, on the basis of the degree-of-association information calculated by means of the order-independent degree-of-association calculation function.

* * * * *